(12) United States Patent
James et al.

(10) Patent No.: US 11,232,440 B2
(45) Date of Patent: Jan. 25, 2022

(54) DUAL DEVICE POINT OF SALE SYSTEM USING SHORT-RANGE WIRELESS CONNECTION

(71) Applicant: Clover Network, LLC, Sunnyvale, CA (US)

(72) Inventors: Daniel A. James, Colorado Springs, CO (US); Michael Reed Hampton, Colorado Springs, CO (US); Blake Williams, Colorado Springs, CO (US)

(73) Assignee: Clover Network, LLC, Sunnyvale, CA (US)

( * ) Notice: Subject to any disclaimer, the term of this patent is extended or adjusted under 35 U.S.C. 154(b) by 126 days.

(21) Appl. No.: 16/667,753

(22) Filed: Oct. 29, 2019

(65) Prior Publication Data

US 2021/0125178 A1 Apr. 29, 2021

(51) Int. Cl.
*G06Q 20/38* (2012.01)
*H04W 4/80* (2018.01)
*G06F 3/0488* (2013.01)
*G06Q 20/20* (2012.01)
*G06Q 20/32* (2012.01)

(52) U.S. Cl.
CPC ....... *G06Q 20/3829* (2013.01); *G06F 3/0488* (2013.01); *G06Q 20/204* (2013.01); *G06Q 20/206* (2013.01); *G06Q 20/3278* (2013.01); *H04W 4/80* (2018.02)

(58) Field of Classification Search
CPC .. G06F 3/0488; G06Q 20/204; G06Q 20/223; G06Q 20/325; G06Q 20/3278; G06Q 20/3829; G07G 1/0009; H04W 12/47; H04W 12/50; H04W 4/80
See application file for complete search history.

(56) References Cited

U.S. PATENT DOCUMENTS

| 9,129,274 | B1 | 9/2015 | Mocko et al. |
| 9,589,428 | B2 | 3/2017 | Edwards et al. |
| 9,965,116 | B1 | 5/2018 | Wolter |

(Continued)

FOREIGN PATENT DOCUMENTS

| KR | 20170090201 A | 8/2017 |
| WO | WO-03/088005 | 10/2003 |
| WO | WO-2016/018246 | 2/2016 |

OTHER PUBLICATIONS

Padgette et al., "Guide to Bluetooth Security", NIST Special Publication 800-121, Revision 2, May 2017, 67 pages.

(Continued)

*Primary Examiner* — David Bilodeau
(74) *Attorney, Agent, or Firm* — Foley & Lardner LLP

(57) ABSTRACT

Methods and systems are disclosed that provide enhanced flexibility to merchants in the configuration of POS systems. One disclosed system includes a payment interface device having a first display, a means for receiving payment information, and a first payment flow display service (PFDS). The system also includes a display device having a second display and a second PFDS. The system also includes a secure wireless connection formed by a first short-range wireless protocol (SRWP) module on the payment interface device and a second SRWP module on the display device. The first and second PFDSs conduct an exchange of messages over the secure wireless connection to execute a payment flow.

20 Claims, 13 Drawing Sheets

(56) References Cited

U.S. PATENT DOCUMENTS

| | | |
|---|---|---|
| 10,068,550 B1 | 9/2018 | Chen |
| 2002/0153414 A1 | 10/2002 | Stoutenburg et al. |
| 2002/0156683 A1 | 10/2002 | Stoutenburg et al. |
| 2004/0114766 A1 | 6/2004 | Hileman et al. |
| 2009/0055266 A1 | 2/2009 | Brody et al. |
| 2010/0043061 A1 | 2/2010 | Martin et al. |
| 2010/0216396 A1 | 8/2010 | Fernandez et al. |
| 2011/0047036 A1 | 2/2011 | Foran-Owens et al. |
| 2012/0010993 A1 | 1/2012 | Ferrara et al. |
| 2013/0194377 A1 | 8/2013 | Humphries |
| 2013/0254117 A1 | 9/2013 | Mueller et al. |
| 2015/0001291 A1 | 1/2015 | Govindarajan et al. |
| 2015/0195008 A1 | 7/2015 | Johnson et al. |
| 2016/0012462 A1 | 1/2016 | Langbein |
| 2016/0012465 A1 | 1/2016 | Sharp |
| 2016/0026990 A1 | 1/2016 | Rezayee et al. |
| 2016/0335675 A1 | 11/2016 | Kshirsagar |
| 2017/0004475 A1 | 1/2017 | White et al. |
| 2017/0192930 A1 | 7/2017 | McKibben et al. |
| 2017/0244566 A1* | 8/2017 | Tschache ............. H04L 9/3242 |
| 2017/0364888 A1 | 12/2017 | Bell et al. |
| 2018/0357636 A1 | 12/2018 | Kumar et al. |
| 2019/0005477 A1 | 1/2019 | Sanders |
| 2020/0196110 A1* | 6/2020 | Jakobsson ............ H04B 1/7143 |

OTHER PUBLICATIONS

Rosa, "Bypassing Passkey Authentication in Bluetooth Low Energy", Raiffeisenbank, a.s., Hvězdova 1716/2b, 140 78 Praha 4, viewed online Oct. 29, 2019 at https://eprint.iacr.org/2013/309.pdf?source=post_page, 3 pages.

Extended European Search Report dated Mar. 25, 2021 from European Application No. 20204213.1, 7 pages.

Chau et al. "Impact of Information Presentation Modes on Online Shopping: An Empirical Evaluation of a Broadband Interactive Shopping Service" 2000, Journal Of Organizational Computing And Electronic Commerce, v. 10 n. 1, p. 1-20.

Extended European Search Report dated Oct. 2, 2019 from European Application No. 19188476.6, 9 pages.

European Office Action dated Aug. 19, 2021 from EP19188476.6 (10 pages).

First Examination Report dated Mar. 27, 2021 from Indian Application No. 201944009827, 8 pages.

Huang et al., "Future personal e-payment: IRFM", Feb. 13, 2006, IEEE Wireless Communications, vol. 13, Issue. pp. 60-66.

* cited by examiner

First mode of operation 502

Connection step 503

Second mode of operation 504

First mode of operation 600

Connection step 601

Second mode of operation 602

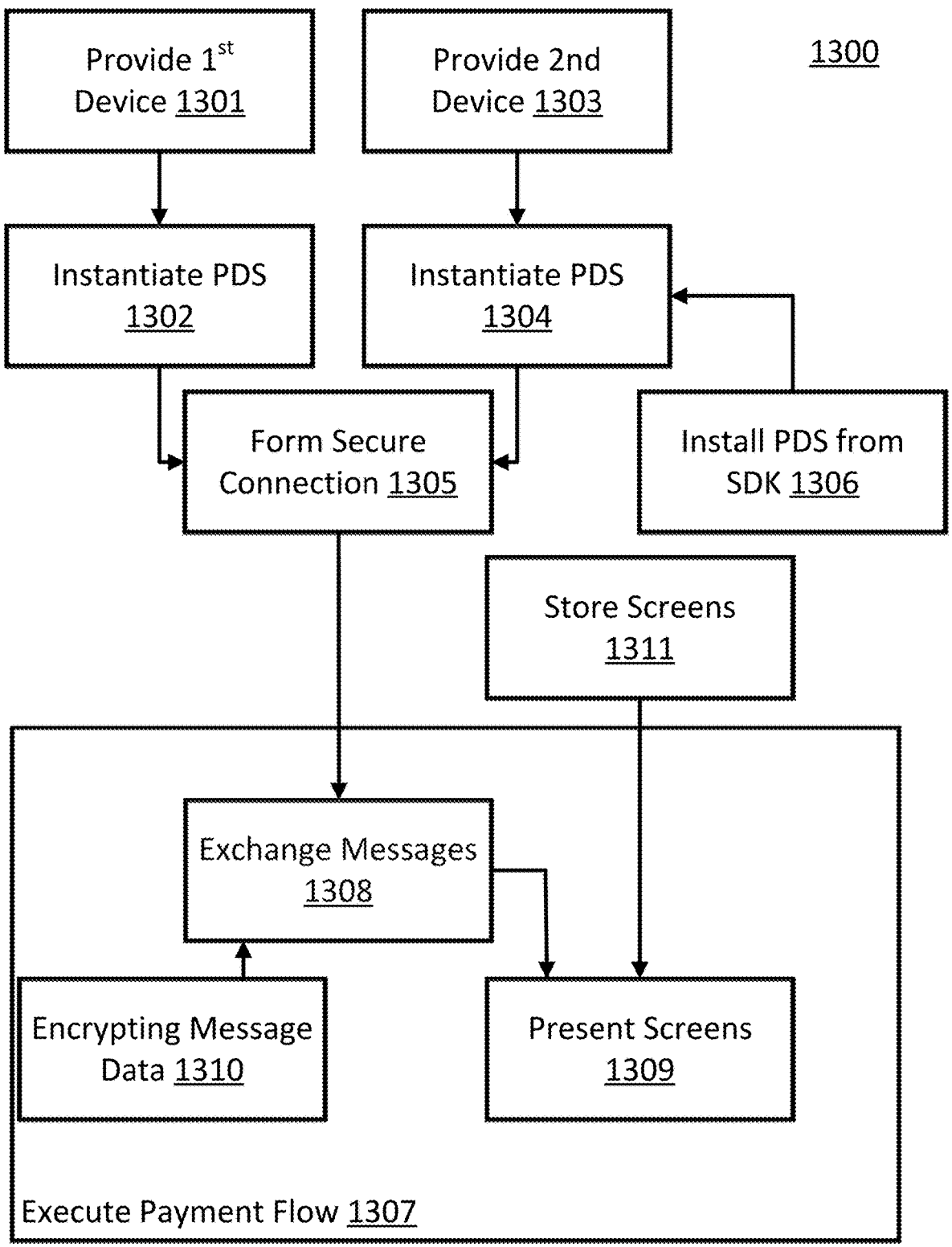

DUAL DEVICE POINT OF SALE SYSTEM USING SHORT-RANGE WIRELESS CONNECTION

BACKGROUND

To complete a commercial transaction, information is required from both a merchant and a customer. In practice, the data is provided by the merchant and the customer to the electronic system facilitating the transaction, such as a point of sale (POS) system. The process of collecting data for facilitating the transaction, presenting prompts for the receipt of that data, and processing the data to obtain approval for the payment that will settle the transaction can be referred to as a payment flow. The payment flow can include creating a purchase order for the transaction, receiving payment information for obtaining approval for the payment that will settle the transaction, and encrypting the payment information for transfer to a payment processor for approval. The POS system must be configured to efficiently and securely receive this information.

Certain POS systems include two devices—one that is intended for use by a merchant and one that is intended for use by a customer. The two devices are connected by a wire to facilitate communication between them for the execution of a payment flow. For example, a customer device could be placed on a portion of a counter proximate to where a customer stands when placing an order, and a merchant device could be located on the other side of the counter. In this type of configuration, the transaction can be completed more efficiently because each user, both the merchant and the customer, has easy access to a device that allows them to enter information to the POS system. In situations in which both devices include a display, the customer data input device can provide a customer with access to a customer system interface while the merchant device can provide a merchant with access to a merchant system interface. The interfaces can include various views presented to the customer or merchant. The views can include prompts for information that must be provided to the system to execute the payment flow and can present information to the customer or merchant to verify before proceeding further with the payment flow.

FIG. 1 illustrates one example of a customer facing device 100 and a merchant facing device 101 that can be used in a POS system to facilitate commercial transactions. The devices 100 and 101 can include displays for communicating information to a user, in which the communication can be accomplished by a cathode ray tube display, a vacuum florescent display, a liquid crystal display, an inorganic or organic light emitting diode display, e-ink display, or any other type of display device, with or without touch screen capability. The displays can present information to guide the users to input information directly into the POS system. The data may be input using: non-touch-display devices, such as a physical keyboard or PIN pad; by the displays themselves if they are configured to receive touch information, such as through a touch screen display; or by other means, such as audio information received by a microphone. In the example illustrated in FIG. 1, the device 100 has a customer system interface 102, and device 101 has a merchant system interface 103. The interfaces 102 and 103 can be presented on touch screen displays that enable the users to simultaneously receive visual information from, and input touch information directly into, the devices 100 and 101.

When interfaces 102 and 103 are presented on touch screen displays, the users can communicate with the devices 100 and 101 by providing touch information at specific points that are designated by virtual buttons 104, which can represent user commands, alphanumeric inputs, a virtual device such as a virtual keyboard or virtual pin pad 105, or other inputs specified by the interface software. In one example, users can be presented with commercial transaction information, such as individual item costs, payment totals, payment types, keyboard or PIN pad input displays, and other information, by virtual display windows 106 on the interfaces 102 and 103. In another example, users can receive prompts provided by the devices 100 and 101 which help the users navigate the commercial transaction process. When customers and merchants are involved in a commercial transaction using a POS system, typically the customer will be the user that interacts with device 100 and the merchant will be the user that interacts with device 101. One prompt that is commonly given to the customer is a prompt for payment information 107 such as a prompt for a personal identification number (PIN), and one prompt that is commonly given to the merchant is a prompt for a payment total confirmation 108. As prompts, such as prompts 107 and 108, are properly addressed by the users, the payment flow for the commercial transaction advances towards completion.

One type of POS system that is implemented widely in the retail space is a supermarket POS terminal with a payment device. A typical configuration includes a terminal that processes the commercial transaction, for use by a merchant, permanently connected to a payment device, for use by the customer during payment. The two devices are connected by a wire that runs from a port on the POS terminal to the payment device. The terminal can continuously provide access to a merchant system interface. The terminal is configured to receive and store item identification data from scanned items using a barcode reader system. The results of the item identification process are shown to the merchant and customer, simultaneously and in real time, by a terminal display screen. Then the terminal calculates the total price to be paid for the items and sends commands to the payment device to process a transaction for that amount. The payment device could include a PIN pad with a display screen, to facilitate the payment process by giving the customer a payment prompt. The payment device could continuously provide access to a customer system interface.

Another type of POS system includes a single POS terminal with a single display screen, wherein the customer and merchant share the terminal to complete the commercial transaction. In other words, the same display provides access to the merchant system interface 102 and the customer system interface 103, but at separate times. For example, a shared POS terminal can be placed in-between the merchant and the customer and rotated on a rotatable stand to face either user. When the customer is using the terminal to make a payment, the terminal can be rotated to face the customer to provide the payment interface to facilitate efficient and secure entry of the user's payment information to the system. When the customer is done, the terminal can be rotated back to the merchant. When the shared screen is accessible to the customer, the customer can be locked out of accessing the merchant interface, such as to change the total payment amount or conduct other illicit activity.

SUMMARY

Methods and systems are disclosed that provide enhanced flexibility to merchants in the configuration of POS systems. In specific methods and systems disclosed herein, at least two discrete devices in a single POS system collaborate over a secure short-range wireless connection to execute a payment flow. In specific embodiments of the invention, the short-range wireless connection can provide effective communication on the order of 75 feet or less. The short-range wireless connection can utilize a Bluetooth (BT) protocol such as a Bluetooth Low Energy (BTLE) 4.2 or newer protocol. The short-range wireless connection obviates the need for a wired tethering cable between the two devices and provides a greater degree of flexibility in the placement of the individual components of the POS system. The devices can therefore be placed on opposite sides of a counter or one device could be placed behind a counter while the other was carried around an establishment by a merchant. Furthermore, these approaches eliminate dependencies on more complex wireless connections such as WiFi connections in environments in which such networks might not be available or may be congested with other traffic. Furthermore, these approaches eliminate the need to setup and maintain SSL certificates for a web-sockets-based connection on each of the component devices of the POS system.

In specific embodiments of the invention disclosed herein, the short-range wireless connection between the two devices is used to pass all information for the payment flow to be collaboratively executed by the two devices. For example, the secure wireless connection can be made secure enough to transmit encrypted payment information, received by a means for receiving payment information as located on one of the two devices, over to the second device. This level of security can be provided by introducing man-in-the-middle (MIM) protections to the secure connection during the establishment of the secure wireless connection. For example, the connection can be formed using an authenticated and confidential channel establishment (ACCE) protocol. The ACCE protocol can include the independent formulation of a shared secret on both the devices based on a preliminary exchange of cryptographic material between the devices. The ACCE protocol can include the use of an elliptical curve Diffie Hellman key exchange to generate the shared secret. As another example, MIM protections can be afforded by forming the connection using an out-of-band (OOB) key delivery system to each device using two separate secure channels from the devices to a single cloud architecture. These and other examples are discussed in more detail below.

In specific embodiments of the invention disclosed herein, the two devices in the POS system both include displays— one which presents a merchant system interface and one which presents a customer system interface. In these embodiments, the secure connection can be used by a first device to transmit information required to render the appropriate interfaces and prompts to the user of the second device, but it does not need to transmit image data because certain approaches disclosed herein include a payment flow display module to render views for the payment flow based solely on simple commands and transaction data as opposed to entire image files. The payment flow display module can have access to views from the merchant or customer system interface stored locally on the device and provide those views in accordance with a current stage of the payment flow without needing to receive the image data associated with the view from the alternative device. As such, a lower-speed short-range wireless communication protocol such as BTLE can be used to facilitate a collaborative execution of the payment flow, including the presentation of interfaces via displays on both devices, without introducing noticeable lag to the payment flow.

In a specific embodiment of the invention disclosed herein, a single POS device can offer both a customer and merchant system interface in a first mode of operation, and only one of those system interfaces in a second mode of operation. In a specific embodiment, a POS device with a single display enables a customer and merchant to conduct a commercial transaction using that single display, and that same POS device can optionally connect to another display device and enable the customer to conduct their portion of the transaction using the original display while the merchant conducts their portion of the transaction using the added display device. The single POS device can be referred to as a dual mode device. The dual mode device can connect to the added display device via a short-range wireless connection. The shift between the two modes of operation can be facilitated by detecting the short-range wireless connection. In other words, the dual mode device can operate in the first mode of operation, and, upon detecting the connection, the dual mode device can switch to the second mode of operation. Furthermore, the dual mode device can be configured to maintain itself in a discoverable state as to the short-range wireless protocol while it is in the first mode of operation and maintain itself in a non-discoverable state as to the short-range wireless protocol while it is in the second mode of operation.

In specific embodiments of the invention, a system is provided. The system comprises a payment interface device having a first touch screen display and a means for receiving payment information. The system also comprises a first payment flow display service instantiated by an operating system of the payment interface device. The system also comprises a display device having a second touch screen display. The system also comprises a second payment flow display service instantiated by an operating system of the display device. The system also comprises a secure wireless connection formed by a first short-range wireless protocol module on the payment interface device and a second short-range wireless protocol module on the display device. The first payment flow display service and the second payment flow display service conduct an exchange of messages over the secure wireless connection to execute a payment flow. The payment flow includes at least: a display of information on the first touch screen display, using both the first and second payment flow display services, based on information received on the display device; and an encryption of payment information received by the means for receiving payment information.

In specific embodiments of the invention, a method is provided. The method comprises providing a payment interface device having a first touch screen display and a means for receiving payment information. The method also comprises instantiating a first payment flow display service using an operating system of the payment interface device. The method also comprises providing a display device having a second touch screen display. The method also comprises instantiating a second payment flow display service using an operating system of the display device. The method also comprises forming a secure wireless connection using a first short-range wireless transceiver on the payment interface device and a second short-range wireless transceiver on the display device. The method also comprises exchanging messages over the secure wireless connection to execute a payment flow using the first payment flow display service and the second payment flow display service. The payment flow includes at least: displaying information on the first touch screen display, using both the first and second payment flow display services, based on information received on the display device; and encrypting payment information received by the means for receiving payment information.

In specific embodiments of the invention, a system is provided. The system comprises a dual mode payment interface device having a first touch screen display and configured to operate in a first mode of operation and a second mode of operation. The first mode of operation: provides access to a merchant system interface on the first touch screen display; and provides access to a customer system interface on the first touch screen display. The second mode of operation: provides a customer system interface on the first touch screen display; and does not provide access to the merchant system interface on the first touch screen display. The system also comprises a merchant display device having a second touch screen display. The merchant display device provides access to the merchant system interface on the second touch screen display. The system also comprises a first short-range radio on the dual mode payment interface device and a second short-range radio on the merchant display device that provide a secure wireless connection between the dual mode payment interface device with the merchant display device. The system also comprises a payment flow display service instantiated on the dual mode payment interface device. The system also comprises a means for detecting the secure wireless connection, located on the dual mode payment interface device. The system also comprises a means for enabling, in response to the means for detecting the secure wireless connection detecting the secure wireless connection: the second mode of operation; and the payment flow display service. The payment flow display service controls the second touch screen display over the secure wireless connection during the second mode of operation

BRIEF DESCRIPTION OF THE DRAWINGS

FIG. 13 illustrates a set of flow chart for a set of methods for forming a secure connection between at least two devices and utilizing the secure connection to collaboratively execute a payment flow in accordance with specific embodiments of the invention disclosed herein.

DETAILED DESCRIPTION

Figure 1:
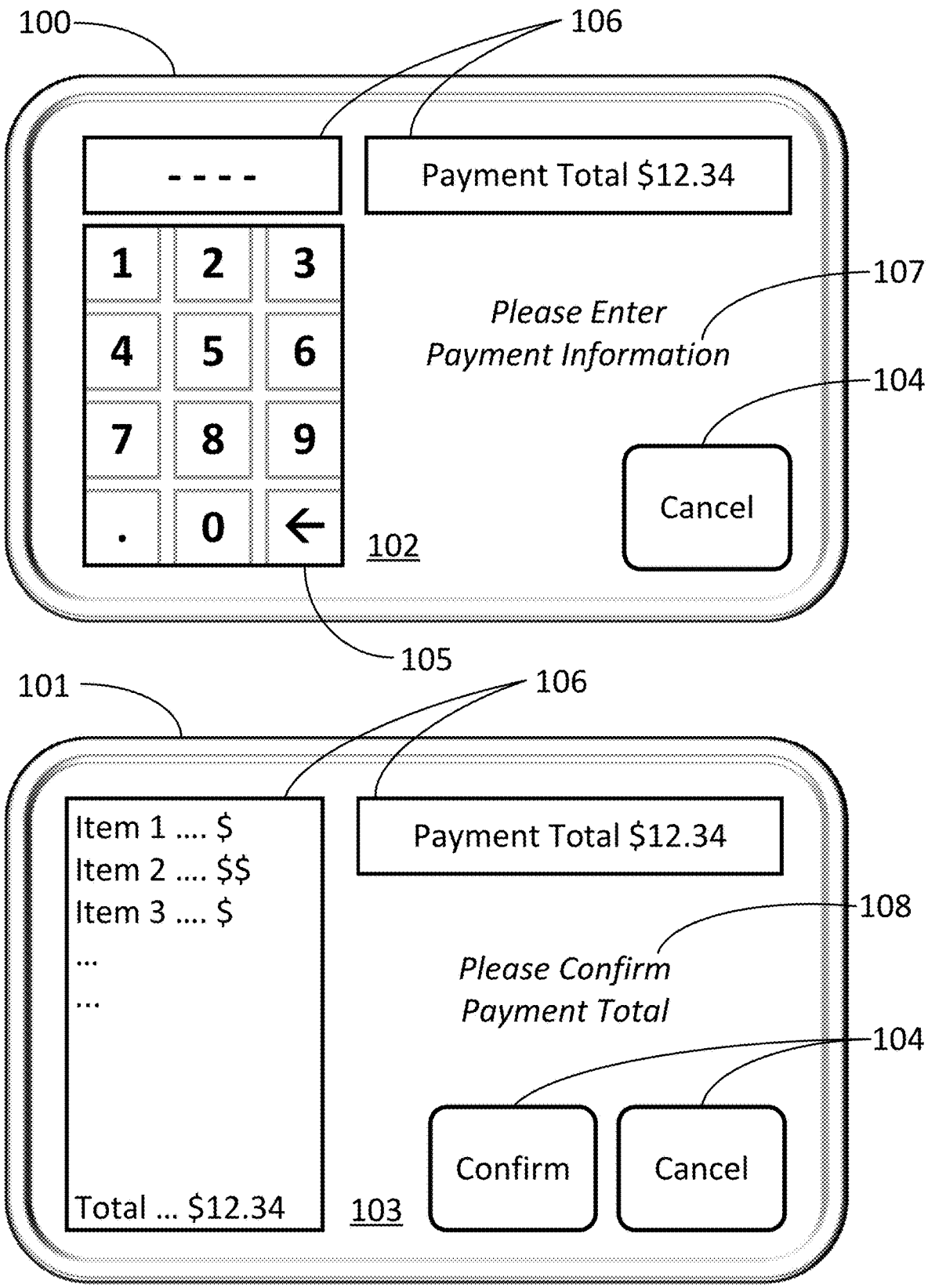
FIG. 1 illustrates a screen of a merchant system interface and a screen of a customer system interface presented on two different devices in accordance with the related art.

Methods and systems related to POS systems with at least two discrete devices connected via short-range wireless communication connections are disclosed. Approaches disclosed herein include specific technical solutions to improve the configurability of POS systems using such short-range wireless communication connections while maintaining a required level of security to the payment information involved in the transaction. Various methods and systems that are in accordance with the summary above are described in detail below.

The methods and systems described below are described in the context of POS systems executing a payment flow for a commercial transaction. The users of the disclosed methods and systems comprise merchants, customers, and other authorized users. Commercial transactions can include the exchange of goods and services for legal tender or credit. The payment flow can include collecting data for facilitating the transaction, presenting prompts for the receipt of that data, and processing the data to obtain approval for the payment that will settle the transaction. The payment flow can include creating a purchase order for the transaction, receiving payment information for obtaining approval for the payment that will settle the transaction, and encrypting the payment information for transfer to a payment processor. The payment information can include account numbers, personal identification numbers (PINS), biometric information, passwords, or any other information that is used by a payment processor to authorize the transfer of funds from one entity to another. Common examples of payment information include 16-digit credit card numbers for credit card transactions and 4-digit PINs for debit card transactions. The POS system can include a means for receiving payment information which is utilized during the payment flow to obtain the payment information. The means for receiving payment information include key pads for receiving PINs, bar code scanners (including QR code scanners), magnetic stripe readers (MSRs) for reading magnetically encoded account numbers, near field communication (NFC) readers for contactless payment processing, finger print readers, infrared surface or gesture analyzers, chip card readers, microphones for receiving auditory information, and other methods known in the industry.

In specific embodiments of the invention, the POS device will include at least two discrete devices which collaborate to execute a single payment flow using a short-range wireless connection. A secure connection between the two devices using the short-range wireless connection can be formed during a pairing procedure. The two devices can include features that allow two or more parties in different physical locations to participate in the transaction. For example, one device can be located near a customer while another device is located near a merchant. As another example, one device can be located by a main hub of merchant activity while another is carried through an establishment to allow for the execution of a payment flow by a mobile employee. In some embodiments, the two devices can include different functionalities that allow the two devices to collaborate on the creation of a payment flow. For example, one device could be a smartphone while another device could be a display-less basic dongle used as a chip card reader or magnetic stripe reader. Specific embodiments can be in accordance with both these classes of approaches in which the two devices are specialized for separate locations and also for separate functionalities associated with those locations. For example, one device could be a payment interface device located in proximity to where a customer usually stands to place an order and includes a means for accepting payment information, while another device could be a simple merchant terminal that displayed purchase order information for allowing a merchant to fulfill the displayed order and orchestrate the payment flow.

In specific embodiments of the invention, a short-range wireless connection between two devices in a POS system is used to pass all information required for the payment flow to be collaboratively executed by the two devices. In contrast to other approaches, the short-range wireless connection can specifically be made secure enough to transmit encrypted payment information. In specific embodiments, the device that encrypts payment information using the highly secure payment keys of the system (e.g., the DUKPUT keys) encrypts the payment information for transmission out of the POS system and on to a payment processor using an entirely different secure channel and does not utilize a standard short-range wireless connection such as BTLE. However, giving the approaches disclosed below to eliminate the threat of MIM attacks on the pairing process between the two devices, a standard short-range wireless connection such as a BTLE connection can be used even for passing secure payment information as well as any other information that is required to be shared between two devices during the execution of a payment flow even before the information is secured with highly secure payment keys. As used in this disclosure the term "payment keys" refers to keys which can be used in an encryption scheme that is sufficiently secure to have payment information encrypted thereby transmitted through a public network such as the Internet while meeting the relevant payment card regulatory standards of a given jurisdiction.

In specific embodiments of the invention, the secure connection and the formation thereof will utilize various security techniques to allow for secure communication between the devices. In specific embodiments, the devices can utilize a symmetric block cipher to encrypt all information transmitted on the secure connection. In specific embodiments, the encryption scheme utilized can be and kind of symmetric or asymmetric cipher. For example, the encryption scheme could be 128-bit, 192-bit and 256-bit AES, RSA, SQUARE, CRYPTON, ARIA, *Camellia*, Data Encryption Standard (DES), Triple Data Encryption Standard/Algorithm (TDES/TDEA), Blowfish, Serpent, Twofish, Threefish, Secure and Fast Encryption Routine (SAFER), International Data Encryption Algorithm (IDEA), Tiny Encryption Algorithm (TEA), extended TEA (XTEA), and others. In specific embodiments, the messages can be combined with a message authentication code (MAC) which can be appended to each message and encrypted with the message. In specific embodiments of the invention, authentication will be provided by a hash-based message authentication code (HMAC) with hashes a MAC with the message at least one time and encrypts the combined hashed. In a specific approach the secure connection can use an AES-128-CMAC key derivation function and an AES-CCSM for data link encryption and data authentication.

In specific embodiments of the invention, the secure connection can be formed using a mechanism that is resistant to man-in-the-middle (MIM) attacks. The devices can utilize protections during the establishment of the secure wireless connection to assure that they are pairing with each other and not a third malicious device that is spoofing the two devices into thinking they are pairing with each other when they are in actuality establishing a secure connection with the third malicious device. For example, if the secure connection relied on a symmetric block cipher, the secret or private keys for the symmetric block cipher can be formed using an MIM resistant mechanism. As another example, if the secure connection utilizes an HMAC, the MAC code could be formed using an MIM resistant mechanism. In specific embodiments of the invention, messages sent on the secure connection can be authenticated to assure that the system is not being attacked by a malicious party issuing spoofed operational messages for purposes of obtaining unauthorized access to payment flow information.

The level of security used to allow for the transmission of payment information over a standard short-range wireless connection can be provided by introducing man-in-the-middle (MIM) protections during the establishment of the secure wireless connection. As anther example, the connection can be formed using an authenticated and confidential channel establishment (ACCE) protocol. The ACCE protocol can include the independent formulation of a shared secret on both the devices based on a preliminary exchange of cryptographic material. For example, a first device and a second device can be configured to form the secure wireless connection using an elliptical curve key exchange. In alternative approaches, the ACCE protocol can include the selection of a prestored shared secret on both devices selected in exchange for identity information provided from the alternative device such as a simple device ID. In alternative approaches, the ACCE protocol can include the exchange of pre-provisioned certificates by the two devices and an according exchange of public keys for either distributing a secret key and verifying the identity of the two devices or for a further exchange of cryptographic material for purposes of generating a shared secret key. The ACCE protocol can include the use of an elliptical curve Diffie Hellman key exchange to generate the shared secret (e.g., those using the P-256 curve). In another example, the devices could be configured to pair using the BTLE LE Security Mode 1 Level 4.

As another example, MIM protections can be afforded by forming the connection using an out-of-band (OOB) key delivery system to each device using two separate secure channels from the devices to a single server. The server can be part of a cloud architecture. The OOB pairing procedure can be conducted via access to the server. For example, the POS system, including at least a first and second discrete device, could be in communication with a server via one or more network connections. The network connection could be an Internet connection. The network connection can be provided via a temporary wired connection or a wireless connection using an alternative technology to the short-range wireless connection. In other words, the pairing procedure relies on the delivery of keys outside the band of the connection itself. Furthermore, the devices do not depend on constant network connectivity to execute a payment flow, as they only need to access the server for purposes of an initial pairing procedure.

Figure 2:
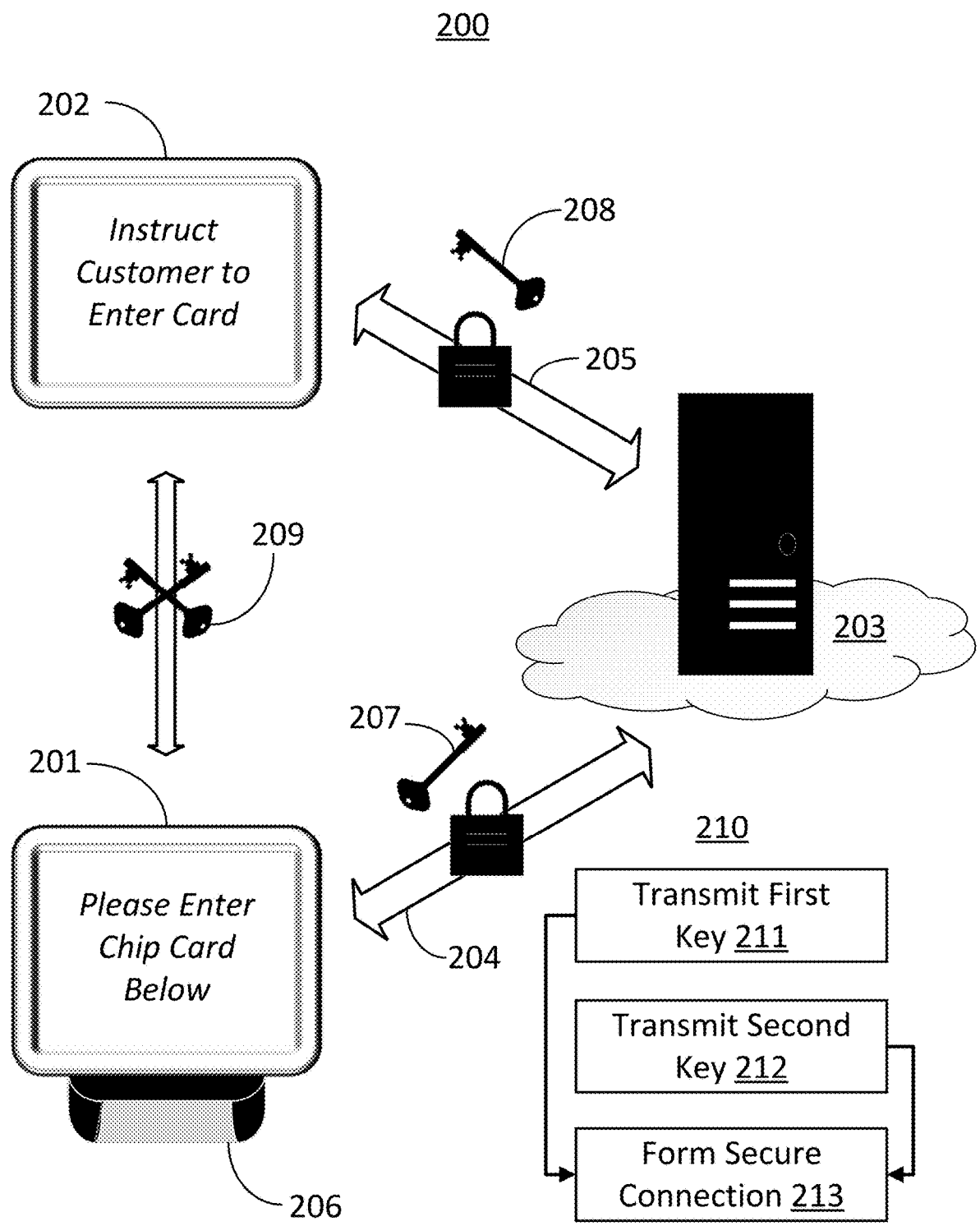
FIG. 2 illustrates a block diagram and accompanying flow chart for a set of methods for forming a secure short-range wireless connection using an out of band key delivery mechanism in accordance with specific embodiments of the invention disclosed herein.

FIG. 2 illustrates a block diagram 200 and accompanying flow chart 210 for a set of methods for forming a secure short-range wireless connection using an OOB key delivery mechanism in accordance with specific embodiments of the invention disclosed herein. To execute an OOB key delivery based pairing procedure, a POS system can include a first secure channel from a server to a first discrete device and a second secure channel from the server to a second discrete device. Accordingly, FIG. 2 illustrates a payment interface device 201 and a display device 202 where payment interface device 201 is connected to a cloud architecture 203 via a first secure channel 204 and display device 202 is connected to cloud architecture 203 via a second secure channel 205. In the illustrated case, display device 202 is a merchant display device intended to display information to a merchant and the payment interface device 201 includes a chip card reader 206. However, an OOB key delivery in accordance with this disclosure can be used with any set of devices disclosed herein. For example, the first device could also be a display-less payment interface device and the second device could be a smartphone.

The secure channels, such as secure channels 205 and 204, can be secure TCP/IP connections such as HTTPS connections using secure web sockets and certificates on the two discrete devices. The connections can be protected using a layer of administrator privileges on a network of devices that are intended for pairing with each other. For example, a merchant can create a layer of administrator privileges for a fleet of devices that can be paired with each other, and that privilege layer can control access to the cloud architecture from any of the devices. The use of web sockets can be applied to situations in which the first and second devices are both sophisticated devices such as in the case of pairing a dual mode payment interface device and a merchant terminal as mentioned elsewhere in this disclosure.

In the illustrated approach of FIG. 2, both devices have a direct secure connection with the server that provides the OOB key delivery (e.g., 204 and 205 are direct network connections). However, in other specific embodiments of the invention, the secure channels can both flow through one of the two discrete devices. For example, a display-less payment interface device could communicate with the cloud architecture via a temporary connection to the second device. The temporary connection would likewise be an OOB connection. This kind of approach would be beneficially applied to situations in which one of the devices did not have the capability to connect to the common server (e.g., the display-less payment interface device might not be sophisticated enough to communicate via a secure web socket). Communication on the temporary connection could be encrypted and authenticated using a pre-provisioned key and identification number on the basic device, and potentially a pre-provisioned certificate on the basic device. The temporary connection could be a wired or wireless connection using some other medium than the short-range wireless protocol itself (e.g., visible, infra, or ultra-violet light pairing, auditory signals, etc.). The second secure channel in these approaches would include the temporary connection.

Flow chart 210 provides an example of how any of the configurations described above can be used to form a secure connection between a first device and a second device using an OOB key delivery. In step 211, a first secure channel can be used to deliver a first key to the first discrete device. This is illustrated in the block diagram 200 via the delivery of key 207 from cloud architecture 203 to payment interface device 201. In step 212, a second secure channel can be used to deliver a second key to the second discrete device. This is illustrated in block diagram 200 via the delivery of key 208 from cloud architecture 203 to display device 202. In step 213, the first and second keys can then be used to form a secure connection between the two devices. This is illustrated in the block diagram by secure connection 209 including the two keys 208 and 209. In specific embodiments of the invention, steps 211 and 212 can be executed asynchronously and in any order prior to the execution of step 213. Once formed, secure connection 209 will be the short-range wireless protocol connection utilized by payment interface device 201 and display device 202 to execute a payment flow.

In the example of FIG. 2, payment interface device 201 and display device 202 execute step 213 in that they are configured to form the secure wireless connection 209 using the first key 207 delivered to the payment interface device 201 using the first secure channel 204 and the second key 208 delivered to the display device 202 using the second secure channel 208. In specific embodiments of the invention, the two keys delivered OOB to the two devices could be used in any pairing procedure reliant upon the provisioning of one or more secret keys to each device that will form part of a secure connection. For example, the two keys could be identical copies of a secret key used for a symmetrical cipher that forms the secure connection or cryptographic material used by both devices to derive such a secret key. As another example, the two keys could be the TKs of a BT pairing procedure. As another example, the two keys could be a seed used for the generation of a shared secret on both devices such as in the creation of a TLS connection.

In specific embodiments of the invention, the messages sent along the secure connection, such as secure connection 209, can be combined with a message authentication code (MAC) which can be appended to each message and encrypted with the message. In specific embodiments of the invention, authentication will be provided by a hash-based message authentication code (HMAC) with hashes a MAC with the message at least one time and encrypts the combined hash. In specific embodiments of the invention, the MAC can be derived from a shared secret used to create the secure connection between the computing device. However, in other embodiments a different shared secret will be used to create the MAC that is separate and distinct from the purely stochastic or cryptographic material used to create the secure connection.

A variety of POS systems can benefit from a short-range wireless protocol exhibiting the higher level of security provided by the approaches described above. For example, POS systems involving a terminal and one or more peripherals that receive payment information but should be able to be placed in an establishment without the inconvenience of a wired tether. Another example is POS systems with multiple terminals that periodically synchronize with a centralized terminal for batch processing of transactions or the storage of information regarding the operation of the POS system. Another example is POS systems in which multiple satellite devices pair with a centralized terminal to process payment flows in combination with the centralized terminal.

Another class of POS systems that can benefit from the secure short-range wireless connections mentioned above are those in which one or more of the devices is a payment interface device and the received payment information needs to be sent, for whatever reason, to a counterpart device. As used herein, the term payment interface device refers to a device with a means for receiving payment information. For example, a payment interface device in the form of a simple dongle with a chip reader or magnetic stripe reader could be paired with a smartphone and used in combination to receive payment information and conduct a payment flow. The payment interface device could both receive and encrypt the payment information. The dongle could be configured to establish a short-range wireless connection with the smartphone and transmit encrypted payment from the dongle to the smartphone. The smartphone could then transmit the payment information in encrypted form to a payment processor to seek approval for the payment and settle the transaction. As another example, both devices could include different means for receiving payment information to increase the number of channels available to the users to pay or to accommodate different payment flows (e.g., a card reader on the dongle and a PIN entry display on a touch screen of the smartphone for processing debit card transactions). Regardless of the approach utilized, a short-range wireless connection between the two devices can be beneficially applied to transfer payment information received on one device to the other device. In the example above, the PIN could be provided to the dongle over the short-range wireless connection using a first form of encryption on the smartphone so that it could be encrypted with a higher level of security on the secure device for transmission onward to a payment processor.

The following disclosure includes two sections dedicated to additional classes of POS systems that can beneficially utilize the type of secure short-range wireless connection mentioned above. POS systems in which at least two devices include displays and collaborate to execute a single payment flow are described below with reference to FIGS. 3-4. The two devices can be referred to as a merchant display device and a customer display device when the two devices are meant to be separately utilized by the merchant and customer. Either or both devices can be payment interface devices. Next, POS systems with dual mode devices that can be paired to a terminal via a short-range wireless connection and set their mode of operation based on the detection of the pairing condition are described with reference to FIGS. 5-8.

As mentioned previously, certain POS systems include two or more devices connected by a secure short-range wireless connection with their own displays such as those in which each party to a transaction will need their own display. For example, a merchant could have a merchant display device which communicates with a customer display device to execute a payment flow. The merchant and customer display devices could be used to allow the merchant and customer to each individually review information pertaining to the payment flow. Both parties could thereby, for example, review the purchase order for the transaction as it was being built (e.g., as the merchant was scanning items for purchase at a grocery store). In specific embodiments of the invention, one or more of the devices will also have touch display capabilities so that the one or more parties to the transaction can also provide input to the payment flow from their respective device. In specific embodiments of the invention, one or more of the devices will also have a means of receiving payment information so that the one or more parties can input payment information to the POS system using their device. In specific embodiments of the invention, each device will include an operating system that controls the display of the device. In specific embodiments of the invention, one device will be a master device and include an operating system and the other device will be a servant device without an operating system. Regardless of the specific configuration and combination of devices, the secure short-range wireless connection can be used to exchange messages that determine what is presented on each of the displays.

Figure 3:
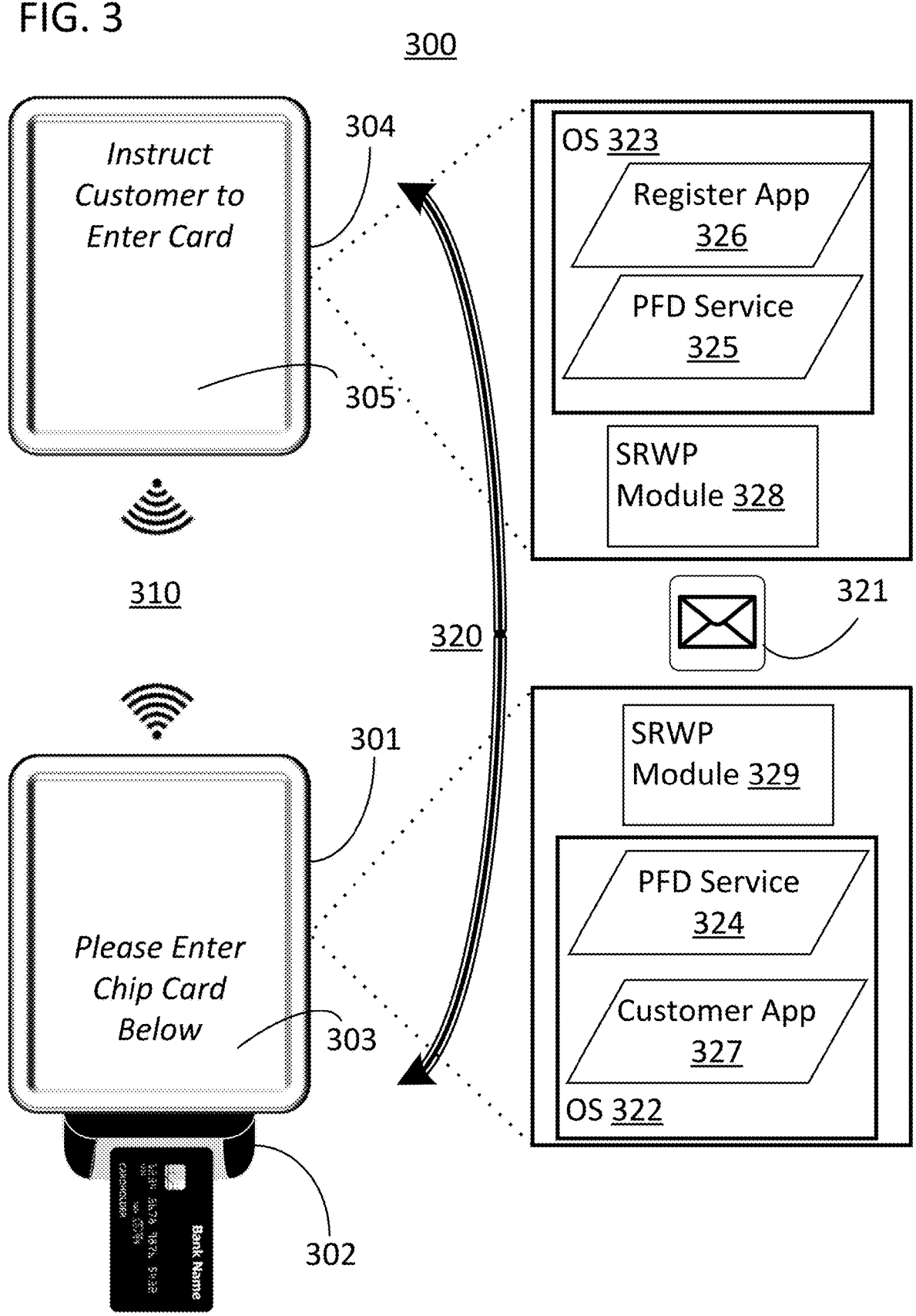
FIG. 3 illustrates a block diagram and overlain data flow diagram of two devices collaborating in the execution of a payment flow using a short-range wireless protocol in accordance with specific embodiments of the invention disclosed herein.

FIG. 3 presents an example of a POS system in which at least two devices have displays in order to describe certain embodiments of the present invention. FIG. 3 includes a block diagram and overlying data flow diagram 300 which provides an example of a POS system in which two different devices each have displays and collaborate over a secure wireless connection 310 to execute a single payment flow. First device 301 can be referred to as a payment interface device because it includes a means for receiving payment information 302. In the illustrated case, the means for receiving payment information 302 is a chip card reader. First device 301 also includes a touch screen display 303. The first device 301 can be utilized by a customer, or merchant depending upon the usage pattern of the system, to provide payment information to the payment flow, and to review information before authorizing the transaction. The second device 304 also includes a touch screen display 305. The two devices are communicatively connected by secure wireless connection 310. Data flow path 320 shows the flow of data through the internal logical systems of the two devices and across the secure wireless connection during their collaborative execution of a payment flow. The data flow path 320 illustrates, for example, how information obtained from one touch screen in the system results in a display of data on the alternative touch screen.

Frist device 301 and second device 302 exchange messages 321 over secure wireless connection 310 to execute a payment flow. The payment flow can include the display of information on the first touch screen display 303 based on information received on the second device 304. For example, the messages exchanged over the secure wireless connection 310 can include transmitting an item identifier from the second device 304 to the first device 301 where the item is select by a merchant on touch screen display 304. The item would then appear as a line item on a purchase order presented for review on touch screen display 303. The payment flow can also include the encryption of payment information received by the means for receiving payment information 302. For example, the first device 301 could receive a credit card number from the means for receiving payment information 302. The first device 301 could then encrypt the information locally before sending it to the second device 304 via messages exchanged over the secure wireless connection 310. The encryption on first device 301 could include usage of the actual payment keys that would be used to transmit the payment information out of the POS system to a payments processor for approval. Alternatively, the first device 301 could rely on the security of secure wireless connection 310 and the actual payment keys for securing information for transmission to a payments processor could be maintained solely on second device 304 such that the payment information was transmitted from the first device 301 to the second device 302 as a necessary step to being transferred to the payments processor for approval.

In specific embodiments of the invention, two or more devices in a POS system will utilize a data path, which includes a secure short-range wireless connection, to display information on a display based on information received from an alternative display. The data path can include the displays, applications used to determine what is displayed on the displays, operating systems which instantiate the applications, short-range wireless protocol modules, and a secure short-range wireless connection formed between the protocol modules and used to exchange messages between the devices. The display of information on both devices can be used to allow the devices to collaborate to execute a payment flow by passing messages over a short-range wireless connection where the first device generates or receives the messages using a first payment flow display service instantiated by an operating system on the first device and the second device generates or receives messages using a second payment flow display service. The second payment flow display service does not necessarily need to be instantiated by an operating system as the second device could be a basic display device with the second payment flow display service instantiated in firmware or directly in hardware on an FPGA or ASIC.

The payment flow display services can be stored on a computer readable medium in the form of a routine that is executable by a processor on the device. The payment flow display service can be an application, routine, or function registered with an operating system on the first device. The payment flow display service can be coded using the source code recognized by the operating system. For example, if the operating system were an Android operating system the routines can be written in Java, C++, Python, or some other language. The payment flow display services can be configured (i.e., coded and appropriately stored and registered) to receive or registered to receive messages from applications that are also registered with the operating system. Alternatively, the payment flow display service could be instantiated by a micro-operating system or BIOS of one of the devices in situations in which one or more of the devices did not have their own operating systems. Alternatively, in a basic display device, the payment flow display service could be instantiated in firmware or directly in hardware on an FPGA or ASIC. The payment flow display services can also be configured to communicate with a module associated with the short-range wireless protocol to receive and transmit messages to such a module. The payment flow display services can be configured to communicate with a counterpart short-range wireless module and present the received information to the display. In specific embodiments of the invention, the payment flow display service can also be designed to interface with alternative modules such as WiFi or USB modules and process messages from any of such modules as they come in.

The short-range wireless protocol modules can be instantiated on the devices in various ways. For example, the modules could be native components of an operating system such as a native BT module of the Android operating system. The modules could be instantiated on the same processor used to instantiate the operating system of the device. Alternatively, particularly in situations in which both devices do not have their own operating systems, the short-range wireless protocol modules could be instantiated on dedicated front-end chips for that particular protocol. The module could be a program used to administrate the creation of a secure connection such as by administrating the handshake and exchange of cryptographic or purely random secret information between the two devices. The module could also be used to discover potential devices for pairing as well as for setting the device in a discovery, discoverable, or undiscoverable mode. The module could also administrate the assembly and disassembly of messages from the payment flow display service into frames or packets for transmission using the wireless protocol module. For example, is the short-range wireless protocol module was a BT module, it could break down messages from the payment flow display service into BT frames for transmission through the air by a BT radio.

The short-range wireless protocol modules can also include submodules that are custom added to an existing operating system to bolster the native short-range wireless modules of the operating system. The short-range wireless protocol module could include a manager module that utilizes the operating system to handle discovery, advertisement, and pairing, and instructs the operating system to perform pre-configured operations in all three instances. The submodules could also include modules that replace the native modules of the operating system. For example, the module responsible for breaking messages down into frames compatible (i.e., a frame module) with the short-range wireless protocol could be custom designed. In specific embodiments, the frame module will include various subclasses. A first subclass is a message frame which could be used to shuttle existing messages from the payment flow display service which are too large to send over a single wireless packet into smaller chunks based on the maximum transmission unit (MTU) of the protocol. The packets can follow the following format in with B0-B13 is a 14 byte header and the "chunks" refer to portions of the payment flow display service messages. [B0][B1][B2-B5][B6-B9][B10-B13][B14+]=[frameType][version][messageId][totalChunks][chunkId][payload]. Another subclass is a configuration or control frame (e.g., TransportConfigFrame). The subclass can be used to inform a short-range wireless protocol client that the connection is paired and secured. This subclass can be used in situations where an application initiates a discovery request, but the operating system doesn't have a mechanism to inform the application when the connection is secured. In these situations, this frame is sent from the payment flow display module on a first device to inform the application that the connection is ready to be used for a payment flow. The frame could also be used to send connection recovery messages, packet loss recovery messages, messages that would explicitly communicate the MTU, etc.

FIG. 3 provides an example of a first device 301 and a second device 304 in a POS system will utilize data path 320 to collaboratively execute a payment flow and display information on devices 301 and 304 based on information received from the counterpart device. Data path 320 flows in either direction such that information from device 301 can be displayed on display 304 and information from device 304 can be displayed on device 301. Movement of data from second device 304 to first device 301 will be described for illustrative purposes. Data flow path 320 can begin with information obtained by device 304, which could include the receipt of data via touch screen 305. In the illustrated embodiment, both devices have their own independent operating systems—operating system 323 and operating system 322. However, in other embodiments, the two devices will not have their own independent operating systems. In the illustrated case, operating system 323 includes a register application 326, which could be a native application of the operating system registered within the source code of the operating system, and operating system 322 includes a customer application 327. The register application 326 could provide access to a merchant interface on device 304. The customer application 327 could provide access to a customer interface on device 301. First device 301 also includes a payment flow display service 324 instantiated by operating system 322 while second device 304 also includes a payment flow display service 325 instantiated by operating system 323. The devices also include short-range wireless protocol module 328 and short-range wireless protocol module 329 which form secure connection 310 and exchange messages 328 over secure connection 310. The payment flow display services 324 and 325 serve as intermediaries between the applications and the short-range wireless protocol modules. They thereby control what is displayed by the devices on which they are instantiated using messages received via data flow path 320.

In specific embodiments of the invention in which the devices include payment flow display services, the two devices can collaborate to execute a payment flow without introducing noticeable lag to the performance of the combined POS system. Such embodiments exhibit certain benefits in that the short-range wireless connection may be a relatively low bandwidth connection as compared to the USB connections that traditionally connect POS devices in dual display POS systems. A specific class of these embodiments can be described with reference to FIG. 4.

In specific embodiments, the secure connection can be used to transmit information necessary for the execution of the payment flow between the devices, but it does not need to transmit image data as certain approaches disclosed herein include a payment flow display module on one or both of the devices with access to stored views. The payment display module can have access to views from the merchant or customer system interface stored locally on the device and provide those views in accordance with a current stage of the payment flow without needing to receive the image data associated with the view from the alternative device. As such, a lower-speed short-range wireless communication protocol such as BTLE can be used to facilitate a collaborative execution of the payment flow, including the presentation of interfaces via displays on both devices, without introducing noticeable lag to the payment flow. These embodiments can also be described with reference to FIG. 4

Figure 4:
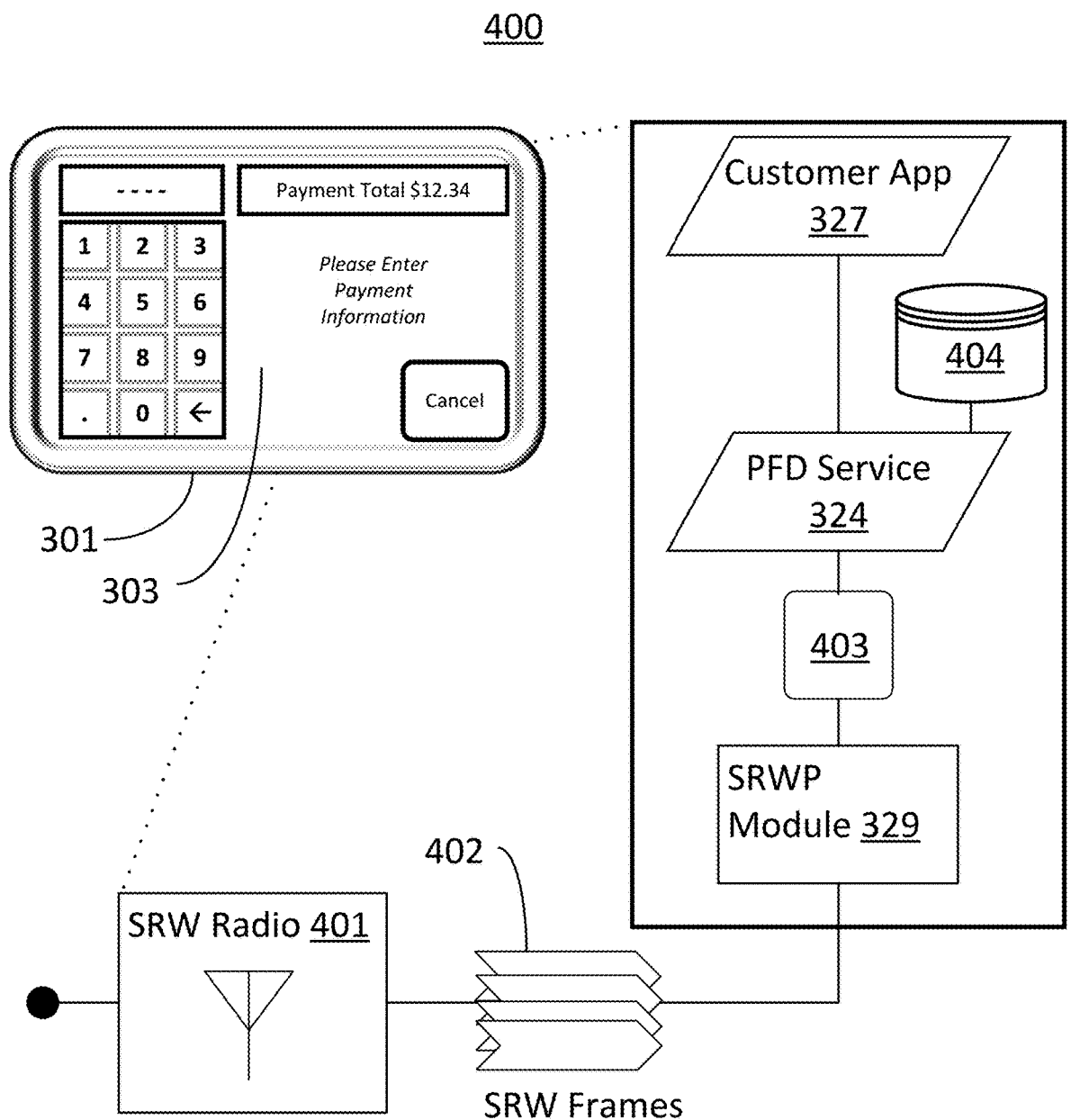
FIG. 4 illustrates a block diagram and overlain data flow diagram to illustrate how a payment flow display service can control a display in accordance with messages delivered using a short-range wireless protocol in accordance with specific embodiments of the invention disclosed herein.

FIG. 4 illustrates a block diagram and overlain data flow diagram 400 to illustrate how a payment flow display service can control a display in accordance with messages delivered using a short-range wireless protocol in accordance with specific embodiments of the invention disclosed herein. FIG. 4 can be conceptualized as a detailed view of one implementation of half of data flow path 320 with an emphasis on the receipt of messages as opposed to the transmission of messages, even though data flow path 320 can operate in both directions. The alternative half of data flow path 320 could, in specific embodiments, be functionally equivalent to the illustrated half. The elements of FIG. 4 which are shared with FIG. 3 utilize the same reference numbers. Device 301 receives messages via a short-range wireless radio 401. The radio could be a short-range wireless transceiver. The radio could be a BT transceiver. Short-range wireless radio 401 receives, processes, and conveys data to a short-range wireless module 329 in digitized form. The data can be in the form of packets or frames such as short-range wireless protocol frames 402. The short-range wireless protocol frames can be BT frames. The frames can include data that will affect the display of information on touch screen display 303. The short-range wireless protocol module 329 can covert the received frames into messages 403 that can be JSON string-based content that the payment flow display services need to exchange in order to execute a payment flow. For example, content utilized by the payment flow display service 324 to control the display 303. When transmitting in the other direction, the devices can utilize the modules described above to convert the content into chunks and package them into frames. In specific embodiments in accordance with FIG. 4, the short-range wireless protocol frames 402 will not include image data. As a result, a relatively low bandwidth wireless connection can be used to facilitate communication for device 301.

First device 301 in FIG. 4 includes a set of interface screens stored by a computer readable medium 404. The set of screens are accessible to payment flow display service 324 for presentation on first display 303. The screens can include things such as a payment summary screens and purchase flow display screens but can also include screens associated with certain more complex applications stored on the first device and similarly registered and available to the operating system on the first device. The screens can be used by the payment flow display service 324 and the customer application 327 to control the display of device 301. Similar approaches can be utilized regardless of whether the device has its own operating system and registered application and regardless of whether the application is meant for a customer or merchant facing configuration. The payment flow display service can pass information to the operating system for display on the device in response to messages received from the second device. The messages exchanged over the secure wireless connection can thereby affect which screens are displayed by the first device. However, the messages exchanged over the secure wireless connection do not need to include image data. As a result, a short-range wireless protocol, such as BTLE can be sued to allow the two-display device to collaborate for the execution of a payment flow without introducing noticeable lag to the system.

In specific embodiments of the invention, the approaches disclosed herein can be applied to allow different types of display devices to function together. For example, the devices could be fully integrated devices designed from the hardware up for interoperability or one device could be a semi-integrated device configured via software or firmware modification to interoperate with another device. Specific approaches of each type of device are described as follows with specific examples referring to FIG. 3.

In specific embodiments of the invention, in which two display devices are designed from the hardware up for interoperability, each device could include a payment flow display service integrated with the device as a native application of the operating system of the device. The payment flow display services could, in these embodiments, be encoded within the source code of the operating system such as in a hardware abstraction layer or peripheral interface layer of the operating system. In these embodiments, the short-range wireless communication protocol modules on each device can be custom designed specifically for interoperability. In addition, they can be designed to execute many of the approaches disclosed below regarding pairing routines and state maintenance that are not features of standard short-range wireless communication protocol modules such as the standard BT module of the Android or iOS operating systems. Furthermore, in these approaches, the first and second payment display service could both be native applications of their respective operating systems and include glue code modifications to the operating system itself that are specifically added to the operating system to facilitate their operation. With reference to FIG. 3, both payment flow display service 325 and payment flow display service 324 could be native applications of operating system 323 and operating system 322 respectively. In these embodiments, the operating systems could likewise be compatible operating systems such as by being the same fork of Android, iOS, Windows, or any other operating system.

In specific embodiments of the invention in which two display devices are configured to operate by modifying the firmware or software of one device to form a semi-integrated solution, one device could include a payment flow display service integrated with the device as a native application of the operating system of the device, and one device could include a payment flow display service installed from a software development kit (SDK). For example, the two devices may be fabricated by separate manufacturers and not be designed from the hardware up for interoperability. In these cases, the operating systems of the two devices might be incompatible. The payment flow display service could therefore be an SDK module registered with the operating system as such. In these embodiments, the operating systems of the two devices might be different and incompatible. For example, they could be Android and iOS, different forks of the same operating system, or any other combination of incompatible operating systems. However, using the payment display services on each device, the messages exchanged between the devices would still serve to allow for collaboration between the two devices over the secure wireless connection in the execution of a payment flow and the display of information on each device based on information first received on the alternative device. As another example, the devices could be semi-integrated devices such that the hardware was not custom designed for full interoperability, but the firmware or core software of the products had been designed for interoperability. In certain approaches, the actual encoding of information used by the second and first payment flow display services will not need to be appreciably modified as each may be configured to process raw BT data into data used by the applications used to execute the payment flow. In specific approaches, one of the devices could include a payment display service that was native to the operating system of the device while the other includes a payment flow display service that was an SDK module. The SDK module could be provided to a designer interested in modifying an existing device to work in a POS system that utilized some of the approaches disclosed herein. For example, an incompatible payment interface device using an iOS operating system could be provided with an SDK module to serve as the first payment flow display service mentioned herein and communicate via a BT module with a second payment flow display service on a display device manufactured by the provider of the SDK module. The display device could be a tablet running the iOS operating system such as an iPad. The SDK module could be encoded using source code identifiable to the operating system of the payment interface device. The SDK module could include the ability to communicate over USB, LAN, and via cloud-based service in addition to the short-range wireless protocol. With reference to FIG. 3, payment flow display service 325 could be native applications of operating system 323 and payment flow display service 324 could be an SDK module installed on operating system 322. In these embodiments, the operating systems could be incompatible.

Figure 5:
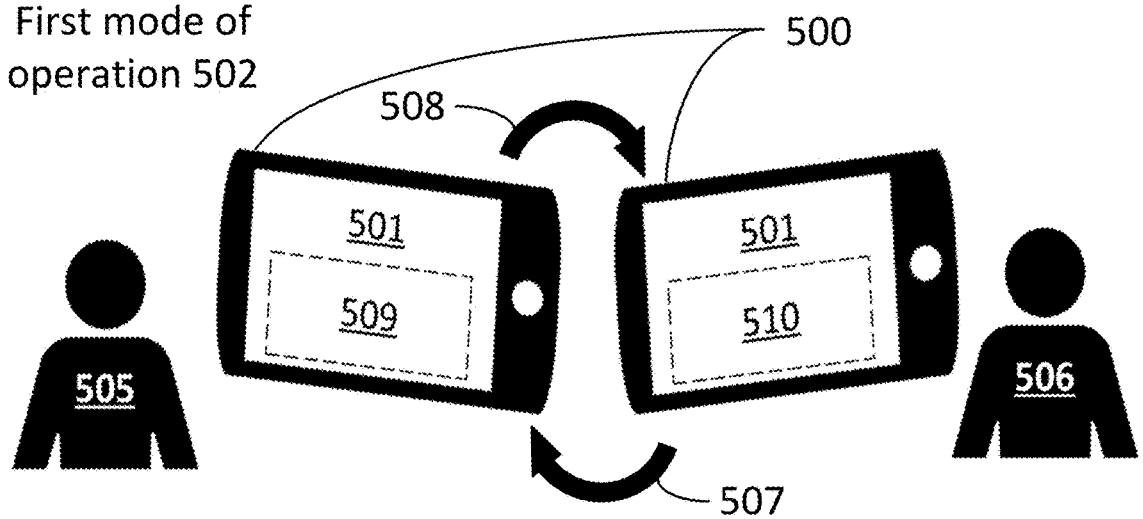
FIG. 5 illustrates a dual mode payment device operating in two modes of operation in which one mode of operation uses a short-range wireless protocol in accordance with specific embodiments of the invention disclosed herein.
Figure 5:
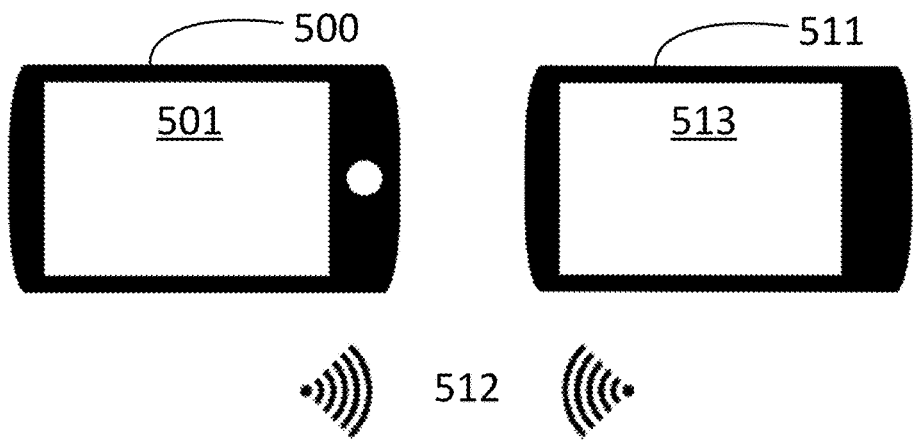
Figure 5:
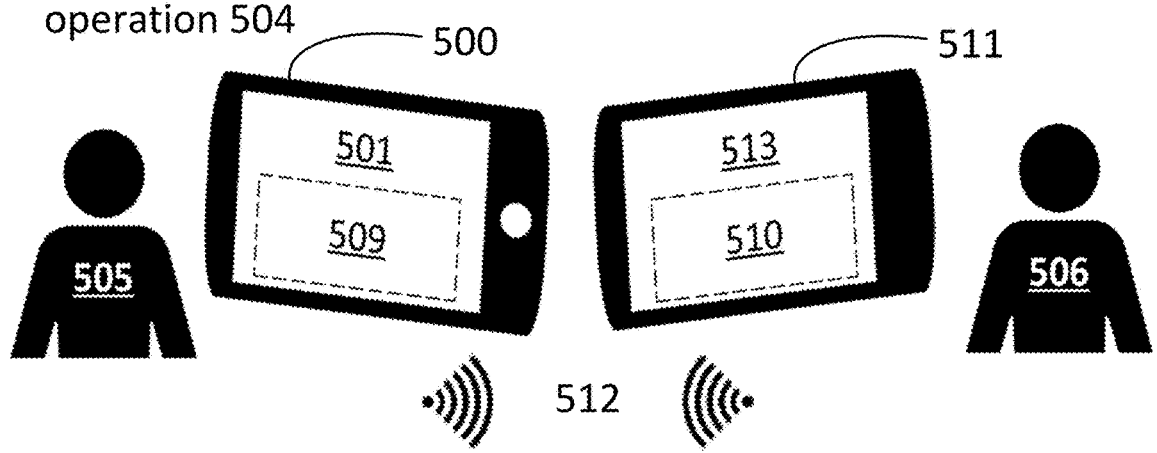

In a specific embodiment of the invention disclosed herein, a single POS device can offer both a customer and merchant system interface in a first mode of operation, and only one of those system interfaces in a second mode of operation. In a specific embodiment, a POS device with a single display enables a customer and merchant to conduct a commercial transaction using that single display, and that same POS device can optionally connect to another display device and enable the customer to conduct their portion of the transaction using the original display while the merchant conducts their portion of the transaction using the added display device. The single POS device can be referred to as a dual mode device. The dual mode device can connect to the added display device via a short-range wireless connection. The shift between the two modes of operation can be facilitated by detecting the short-range wireless connection. Furthermore, the dual mode device can be configured to maintain itself in a discoverable state as to the short-range wireless protocol while it is in the first mode of operation and maintain itself in a non-discoverable state as to the short-range wireless protocol while it is in the second mode of operation. Variants and benefits of these embodiments are disclosed in more detail below FIG. 5 illustrates a specific embodiment of a dual mode payment device 500 that is in accordance with teachings of the prior paragraph. FIG. 5 illustrates a system used for commercial transactions that can include dual mode payment interface device 500 having a first touch screen display 501. Dual mode payment interface device 500 has two modes of operation and is illustrated in three possible configurations. In the first configuration, device 500 operates in a first mode of operation 502. In the second configuration, device 500 undergoes a connection step 503. In the third illustrated configuration, device 500 operates in a second mode of operation 504.

In first mode of operation 502, the dual mode payment interface device 500 can operate without other devices such that users, which can include a customer 505 and a merchant 506, provide inputs to the dual mode payment interface device 500 at separate times. In the same example, the inputs can be provided to the system by the users using the touch screen display 501. In another example where the disclosed systems operating in the first mode of operation 502, at one point in time the dual mode payment interface device 500 can be rotated to an orientation that is customer facing 507, while at another point in time can be rotated to an orientation that is merchant facing 508. In the same example, the switching between the customer facing 507 to merchant facing 508 orientations can happen any number of times and in any order. When multiple users can use the screen, the touch screen display 501 can be considered as a shared screen. In an embodiment illustrated in FIG. 5, the shared screen can enable the dual mode payment interface device 500, after switching to customer facing 507, to provide access to a customer system interface 509 on its touch screen display 501, and after switching to merchant facing 508, provide access to merchant system interface 510 on its touch screen display 501. Throughout this process, the dual mode payment interface device 500 is simultaneously guiding the users through the process of the commercial transaction with prompts shown on the interfaces. In one example, the customer system interface 509 can provide a prompt for payment information and the merchant system interface 510 can provide a prompt for a payment total confirmation.

Purchasers of the POS systems in accordance with the disclosures herein, such as merchant 506, could prefer the system comprising the dual mode payment interface device 500 in the first mode of operation 502 in certain circumstances. For example, when the space used for the commercial transaction is limited. The device used in the first mode of operation 502 can have a relatively small footprint and the fact that it can also be shared means that the total area required for the POS system is indeed limited. Another advantage of the system in the first mode of operation 502 is its relative low cost as only one single display device is required for system functionality. As such, the solution is a relative cheaper option compared to systems that require more than one device or display.

With the benefits of the first mode of operation 502 described above taken as a given, there are, concurrently with the cases discussed above, commercial transaction environments that can require added functionality from the dual mode payment interface device 500, that are in addition to what is described in the first mode of operation 502, to meet customer demand. In one example, a second display screen could be required to preclude the extra time needed to turn the dual mode payment interface device 500 between customer facing and merchant facing orientations. In another example, enhanced payment information security can be desired. Providing a dedicated screen to the customer 505 can help prevent the merchant 506 from seeing private payment information, such as a debit card PIN number, as well as other personal commercial transaction information, such as a customer-elected tip payment amount when paying for services where tip payments are expected. Providing a dedicated screen to merchant 506 can likewise prevent customers from illicitly accessing the merchant interface to change the amount of the transaction or access the merchant's core business information which could be accessible via the merchant system interface. For example, the merchant could have access to their inventory management system, price setting system, or confidential business information via the merchant system interface.

Systems and methods illustrated in FIG. 5 in the connection step 503 and the second mode of operation 504 disclose embodiments in which the dual mode payment interface device 500 can transition from a stand-alone device system configuration in the first mode of operation 502 to a multiple device system configuration in the second mode of operation 504. In other words, the system can be configured at the discretion of the system purchaser to utilize the advantages, as described above, of the first mode of operation 502, or of the advantages of the second mode of operation 504, providing three distinct benefits. Firstly, this configuration choice can be implemented at a lower total cost than the cost of acquiring two different systems that are permanently configured to the first mode of operation 502 and the second mode of operation 504. Second, the ability to transition to the second mode of operation only requires a marginal additional investment in that the payment processing and other complex functionality of the system is already provided by the initial device and the additional device is inexpensive because it provides a much more limited set of functionalities. Third, in accordance with the approaches disclosed below, transitioning the system from the first mode of operation 502 to the second mode of operation 504 can, by virtue of the novel design, be accomplished with very little technical skill and time, thus permitting system reconfiguration in almost any commercial transaction environment.

The connection step 503 provides an example of how the dual mode payment interface device 500 can be transitioned between the first mode of operation and the second mode of operation. In step 504, dual mode payment interface device 500 is connected to a merchant display device 511 by a secure wireless connection 512 that provides a communicative connection between the two devices. The secure wireless connection 512 can be formed by two wireless short-range radios and associated short-range wireless protocol modules on devices 500 and 511. The secure wireless connection can transmit and receive electrical signals to and from the devices. The merchant display device 511 can have a second touch screen display 513, wherein the second touch screen display 513 can provide access to the merchant system interface 510. In specific embodiments, the second mode of operation 504 is enabled by the communicative connection. The dual mode payment interface device 500 can detect the communicative connection and enable the second mode of operation 504 in response to detecting the communicative connection. The dual mode payment interface device 500 can include a means for detecting the communicative connection and a means for enabling the second mode of operation 504. When device 500 is in the first mode of operation and unpaired, device 500 and/or device 511 can maintain itself in a discoverable or discovering mode. When device 500 and device 511 are paired, and device 500 operates in the second mode operation and paired, device 500 and/or device 511 can maintain itself in an undiscoverable mode.

Enabling the second mode of operation can involve various aspects. Enabling the second mode of operation can include allowing dual mode payment interface device 500 to enter a mode in which it only displays the customer system interface on its own screen and transmits the information necessary to display the merchant system interface over the secure wireless connection for ultimately presentation on the merchant display device 511. The information transmitted in this manner can be sent using the payment flow display services mentioned above such as payment flow display service 324. The means for enabling the second mode of operation can switch device 500 into this mode of operation automatically or provide a prompt requesting user confirmation that the mode of operation should be entered. In general, enabling the second mode of operation involves allowing the device to enter that mode either automatically or through some form of user input such as selection of the mode in a settings menu. Enabling the second mode of operation can also include causing device 500 to provide a customer system interface 509 on the touch screen display 501 of the dual mode payment interface device 500 while, concurrently, the device does not provide access to the merchant system interface 510 on the touch screen display 501. The dual mode payment interface device 500 can be programmed to lock-in to the second mode of operation 504 upon detecting the communicative connection. When locked-in, the dual mode payment device will only be capable of providing the customer system interface and will stay in that mode until the communicative connection is lost.

Figure 6:
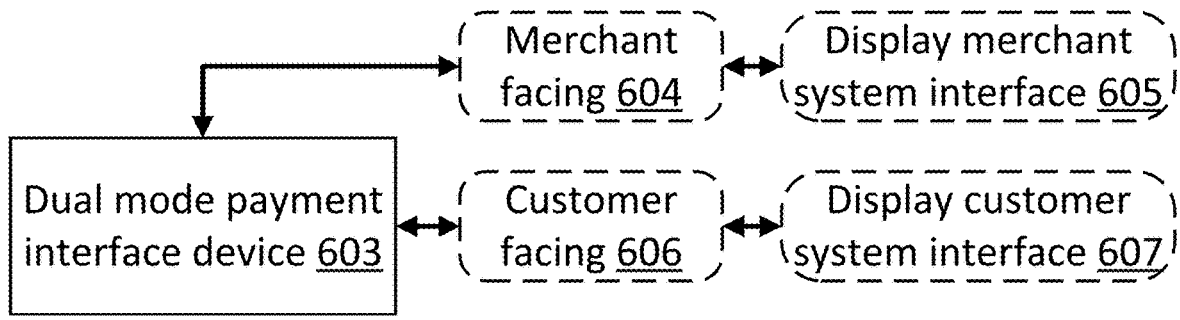
FIG. 6 illustrates a block diagram and accompanying flow chart for a dual mode payment device operating in two modes of operation in which one mode of operation uses a short-range wireless protocol in accordance with specific embodiments of the invention disclosed herein.
Figure 6:
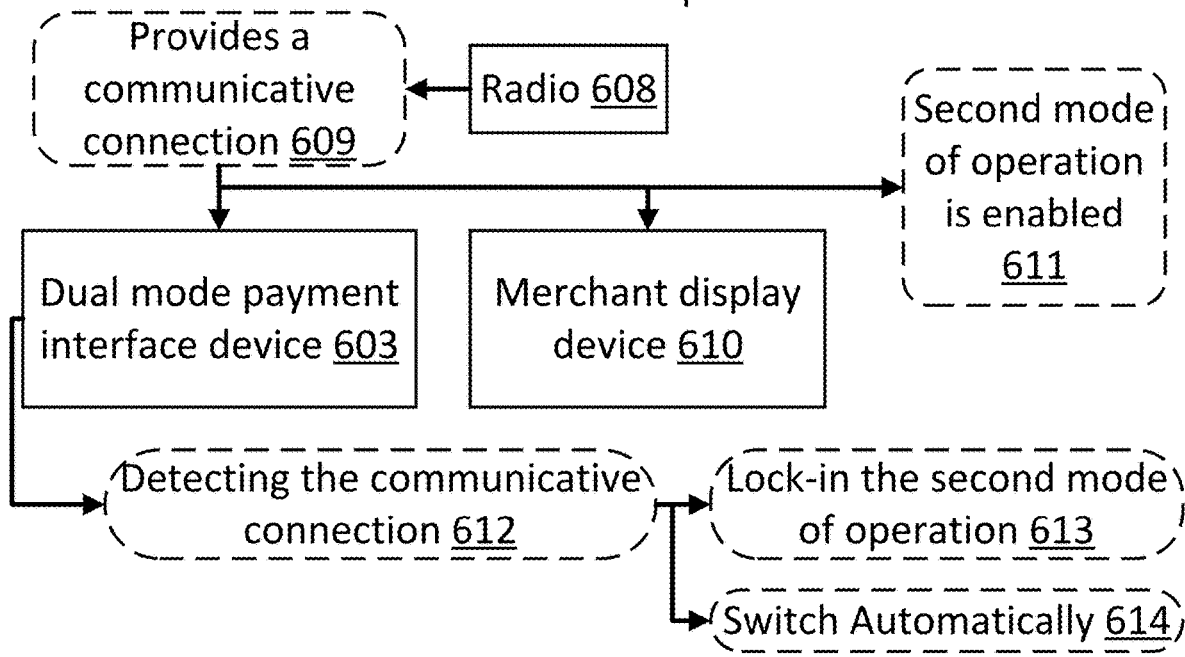
Figure 6:
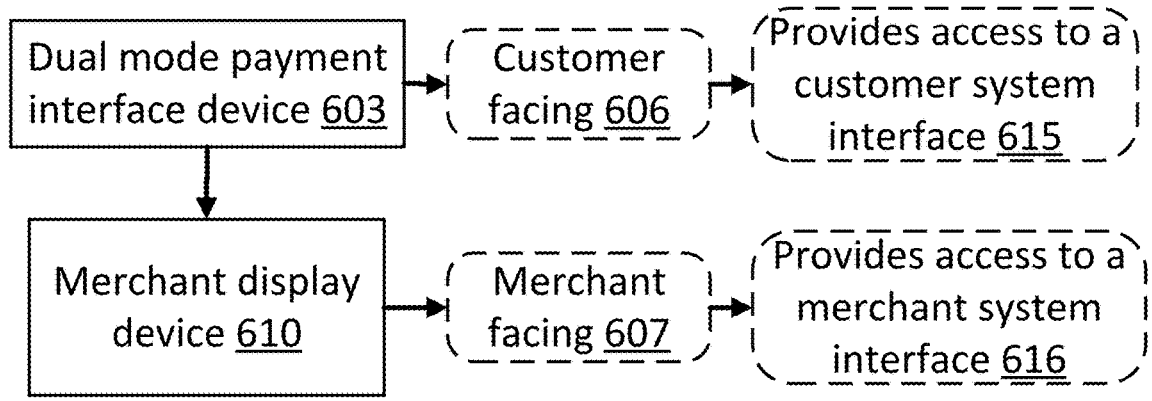

FIG. 6 provides a block diagram and flow chart demonstrating one example of a set of methods for using a dual mode payment interface device, as described in part previously with reference to FIG. 5, when it is used by users in the first mode of operation 600, when it is being connected to additional hardware and devices in a connection step 601, and when it is used by users in the second mode of operation 602. In this figure, rectangular blocks with solid borders can indicate devices comprising physical structure and electrical hardware, rectangular blocks with smoothed corners and broken borders can indicate method steps of the embodied systems and methods, and solid arrows that connect two blocks together can indicate a unidirectional or bidirectional communicative connection between, modification to, or enablement of, those blocks.

The connection step 601 can be considered as a subset of operational behavior of the disclosed systems while in the first mode of operation 600. In some embodiments, a dual mode payment interface device 603 will begin in the first mode of operation 600 wherein the customer and the merchant share the interface of the dual mode payment interface device 603 to proceed with the commercial transaction. The dual mode payment interface device 603 can be reoriented to become merchant facing 604, after which the interface can provide access to the merchant system interface 605 to show prompts for inputs, and other information, to the merchant. Alternatively, the dual mode payment interface device 603 can be reoriented to become customer facing 606, after which the interface can provide access to the customer system interface 607 to show prompts for inputs, and other information, to the customer. The reorientation of the device and the displaying of interfaces can happen any number of times and in any order.

A radio 608 provides a communicative connection 609 between a dual mode payment interface device 603 and a merchant display device 610 in the connection step 601 and, thereby, the second mode of operation is enabled 611. In one embodiment, when the dual mode payment interface device 603 and the merchant display device 610 are communicatively connected, the dual mode payment interface device 603 can detect the communicative connection 612. In one example, the dual mode payment interface device 603 is programmed to lock-in the second mode of operation 613 upon detecting the communicative connection 612. In one example, the dual mode payment interface device 603 is configured to switch 614 from the first mode of operation 600 to the second mode of operation 602 automatically upon detecting the communicative connection 612.

The dual mode payment interface device 603 can be in the second mode of operation 602. In one example, the dual mode payment interface device can be connected to the merchant display device 601, wherein the two connected devices can be oriented to be customer facing 606 and merchant facing 607, respectively. In the same example, the dual mode payment interface device 603 provides access to a customer system interface 615 on its touch screen display and does not provide access to the merchant system interface on its touch screen display. In the same example, the merchant display device 610 provides access to a merchant system interface 616 on its touch screen display.

In specific embodiments, a dual mode payment interface device can be locked-in to the second mode of operation by the communicative connection for additional security. In these embodiments, the dual mode payment interface device can express the second mode of operation, and only the second mode of operation, while the communicative connection between the merchant display device and the dual mode payment interface device is detected. Furthermore, in specific embodiments, the dual mode payment device can maintain itself in an undiscoverable state with respect to the wireless protocol used to form the secure wireless connection, while the communicative connection is detected. These approaches provide certain benefits in that the merchant operator of the merchant display device can remain confident that the dual mode payment interface is not being used to access the merchant system interface so long as the display of the merchant display device is presenting the merchant system interface. To this end, even if the system occasionally places the merchant display device in an idle state in which the screen is not active, the merchant display device can still receive a specific screen saver indicative of the communicative connection remaining active and the device remaining in an undiscoverable state. Then, if the display of the merchant display device ever indicates that the communicative connection has been lost, the merchant will know to stop allowing customers to interact with the dual mode payment interface device and trouble shoot the system.

In specific embodiments, a dual mode payment interface can be conceptualized as the customer-facing device when it is operating in combination with the merchant display device, and the merchant display device can, of course, be conceptualized as an add-on merchant-facing device. In alternative approaches, the add-on device is a customer-facing device. However, using a device with a payment interface as the customer-facing device in the combined system offers significant benefits. For example, the add-on device can be a more basic piece of hardware that only provides a display and a way to receive commands instead of the complex hardware required to encrypt and secure payment information. Therefore, the system can be upgraded at lower cost than would otherwise required. As another example, the combined system offers certain security benefits. Due to industry security requirements, such as those put forward by the payment card industry (PCI), payment information needs to be heavily secured at all phases of use during payment processing. For example, the information must be encrypted as soon as it is received by the system. In alternative approaches in which the add-on device is designed to receive payment information and transfer it to a payment information processing system on the main device a complex system would need to be put in place to assure that the information was encrypted as it was first received and transferred to the peripheral. However, this requirement is avoided by having the main device be the customer-facing device when operating in the combined system because it is already equipped to securely receive and transmit payment information for processing by a remote approval system.

In specific embodiments, a dual mode payment interface device is configured to switch from the first mode of operation to the second mode of operation automatically upon detecting the communicative connection. For example, the operating system of the dual mode payment interface may include an event listener set to detect connection using the short-range wireless protocol to the merchant display device, and a routine that immediately instantiates a second display and beings transmitting information regarding the merchant system interface to that second display when a connection is formed by the short-range wireless protocol module. These approaches provide certain benefits in that the same device can quickly switch between modes as the immediate needs of the merchant's store changes. Again, the different modes can also affect the state of the device as to the wireless protocol such as being in a discoverable, undiscoverable, or discovering mode. The dual mode payment interface device can also switch back to the first mode of operation with some degree of flexibility. However, given security concerns, in some approaches the display of the dual mode payment interface device will first present a request for a merchant unlock when switching back to the first mode of operation. The merchant unlock can require the entry of a merchant PIN or a physical key before reverting the dual mode payment interface device to the first mode of operation. The second mode of operation may commence with the presentation of a "Confirm" request on the display of the merchant display device, as transmitted thereto by the payment flow display service of the dual display device, and/or a similar request on the display of the dual mode payment device. The second mode of operation may also commence with the presentation of a confirm request on the dual mode payment interface device before the dual mode payment interface device presents the customer system interface.

Figure 7:
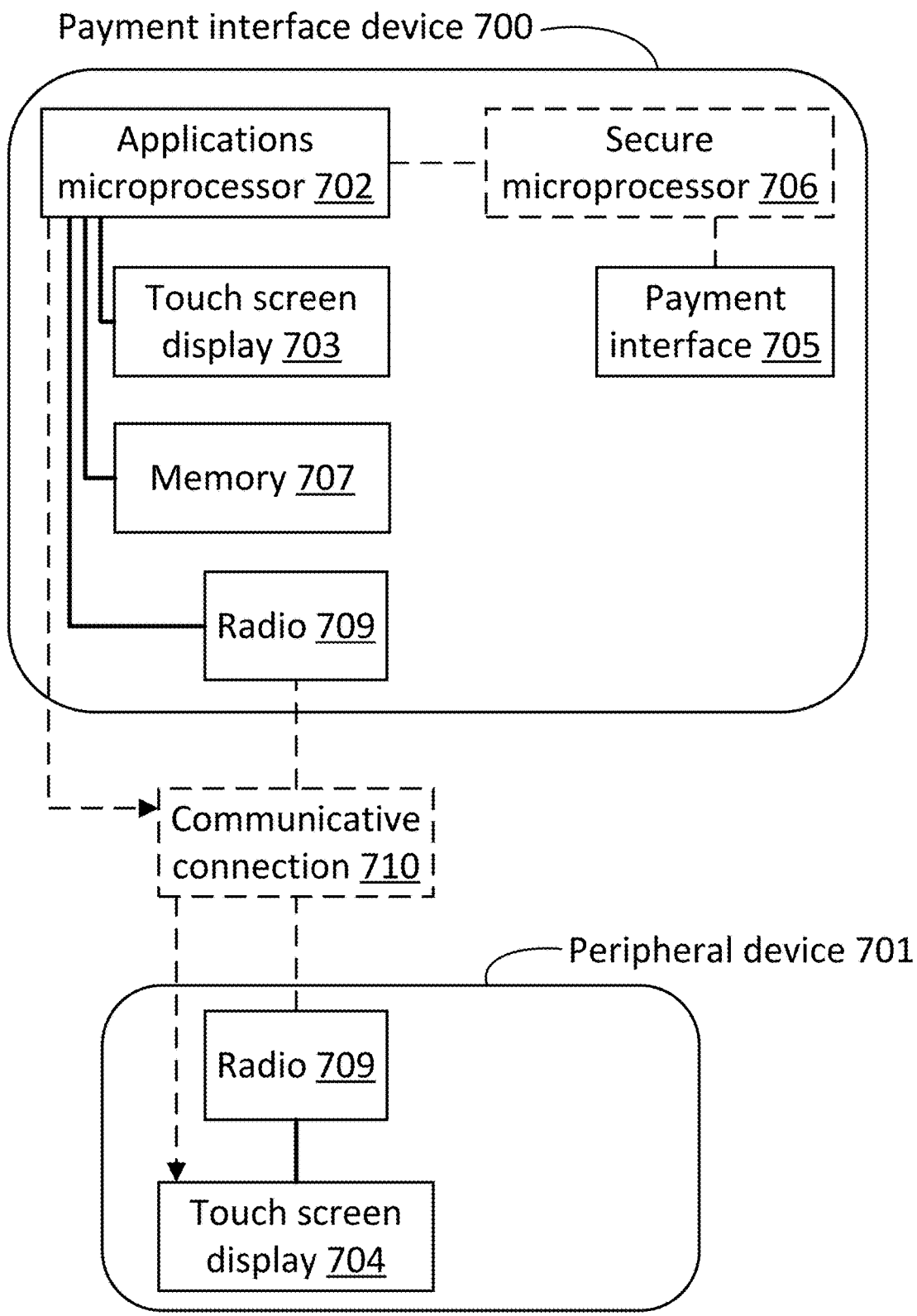
FIG. 7 illustrates a block diagram for a dual mode payment device and accompanying peripheral device with a touch screen in accordance with specific embodiments of the invention disclosed herein.

FIG. 7 illustrates a block diagram for a hardware configuration scheme that represents an embodiment of the systems and methods disclosed herein. FIG. 7 includes a payment interface device 700 and a peripheral device 701. The communicative connection 710 between the devices could exhibit the characteristics of any of the secure short-range wireless connections disclosed herein. In this figure, solid and dotted lines that connect two blocks indicate a direct and two-way communicative connection between those blocks, and blocks with dotted outlines indicate optional variations of the illustrated system. Lines with arrow heads indicate one-way communication between the blocks in the direction of the arrows.

In one embodiment, the payment interface device 700 can include an applications microprocessor 702 that can instantiate an operating system. As illustrated, the peripheral device 701 does not include a microprocessor and does not include its own operating system. The operating system can be any type of operating system commonly used in the mobile devices, such as iOS, Android, Android Go, Tizen, BlackBerry, Windows Mobile, and other operating systems. In this embodiment, the operating system can control both: one system interface displayed on the payment interface device 700 touch screen display 703; and another system interface displayed on the peripheral device 701 touch screen display 704; wherein the system interfaces can operate as customer system interfaces and merchant system interfaces as described previously, or any other types of interfaces.

In one example where the Android operating system can be utilized for controlling the displays 703 and 704, the operating system can leverage native applications, such as those available in Android, version 7.0 "Nougat" and later, or third-party applications, such as the multi-window functionality in the Samsung Galaxy series mobile devices, to enable the applications microprocessor 702 to implement system interfaces across multiple displays. In these embodiments a payment flow display service on payment interface device 700 can translate views intended for display on peripheral device 701 into messages for the secure wireless connection between devices 700 and 701 and a payment flow display service on payment interface device 701 could translate them back for display on touch screen display 704. In one example, the applications microprocessor 702 can be a Qualcomm Snapdragon series microprocessor, or another mobile device processor commonly used for managing multiple displays. The touch screen displays 703 and 704 can optionally be augmented with other types of displays, such as those that do not have touch screen capability, including LED, LCD, e-paper, and other display types, and can optionally have connected data input devices, such as key pads, key boards, PIN pads, or other data input devices to augment the input of information by the users of the devices.

In one embodiment, the payment interface device 700 can have a payment interface 705. In one example, the payment interface device 700 can optionally include a secure microprocessor 706 to process payment information in a cryptographically secure manner. The devices that receive payment information generally also include injected payment keys that are used to encrypt payment information for transfer to a payment processor. In embodiments where a secure microprocessor 706 is present and connected to the applications microprocessor 702, the connection is configured such that in cases where secure information, such as payment information, is unencrypted, it cannot be communicated from the secure microprocessor 706 to the applications microprocessor 702.

In some embodiments, the payment interface device 700 can include an electronic memory 707 to store data, programs, and applications for the applications microprocessor 702 to process, including operating systems and interface systems. In one example, the memory 707 can be volatile memory device such as dynamic random access memory, static random access memory, or other types of volatile memory commonly used in mobile devices. In another example, the memory 707 can be non-volatile memory device such as solid state hard disk, mechanically rotating hard disk, an optical disc, or other type of non-volatile memory commonly used in the industry.

In some embodiments, the payment interface device 700 and peripheral device 701 can include wireless radios 709 which allow the two devices to communicate over communicative connection 710. The wireless radios 709 could act as a transceiver for wireless communications of any standard type or frequency band, including such standards as the Wi-Fi/IEEE 802.11 series, EDGE, the EV-Do series, Flash-ODFM, GPRS, the HSPA standards, Lorawan, LTE, RTT, the UMTS series, WiMAX, 6LoWPAN, the Bluetooth series, IEEE 802.15.4-2006, Thread, UWB, Wireless USB, ZigBee, ANT+, and other standards. Connection 710 can be a communicative connection having the characteristics of connection 310 described above. Device 700 can likewise include the components of device 301, in particular, the elements along data flow path 320 can be instantiated using applications microprocessor 702, and memory 707 can include the contents of memory 404. The radios can each be connected to an accessories hub located on each device (e.g., one located between radio 708 and applications microprocessor 702 on payment interface device 700, and one locate between touch screen display 704 and radio 709 on peripheral device 701. The accessories hub on peripheral device 701 and applications microprocessor 702 can each include an installed payment flow display service to control the display of information on their displays and to coordinate the transfer of data between the two devices for this purpose. Peripheral device 701 could also have a memory similar to memory 404 attached to its peripheral hub for this purpose.

In some embodiments, the payment interface device 700 and the peripheral device 701 can have specific accessories, and can make use of one or more communicative connections 710, to facilitate an efficient and secure commercial transaction through use of the accessories and communicative connections 710. One example of a method that facilitates an efficient and secure commercial transaction is described previously with reference to the method steps in FIG. 6. In one example, the touch screen display 703 can be used to provide a customer with access to a customer system interface, instantiated by the application microprocessor 702 operating system, that can provide any type of customer-relevant commercial transaction information, commands, or prompts to the customer, such as guiding the customer through the necessary commercial transaction steps and providing the customer with a prompt for payment information. The customer can use the payment interface 705 in response to the prompt for payment information to make a payment using a compatible method, such as credit card, NFC, and others described previously. In another example building upon the configuration of the previous example, a communicative connection 710 can be established with the peripheral device 701 through the accessory hubs of both devices, enabling the applications processor 702 operating system to implement a multi-window display scheme. The multi-window display scheme can further provide access to a merchant system interface by displaying, on touch screen display 704 of the peripheral device 701, a merchant system interface to a merchant. The merchant system interface can provide any type of merchant-relevant commercial transaction information, commands, or prompts to the merchant, such as a prompt for payment total confirmation to authorize the commercial transaction. The utilization of the touch screen display 704 by the applications processor 702 through the accessory hub of the peripheral device 701 renders the touch screen display 704 a specific species device in the genus of accessories 708 devices. In another example, the communicative connection 710 can be established between other types of devices, such as a printer device, to the accessory hubs of the payment interface device 700 or of the peripheral device 701. Through the communicative connections 710, the applications microprocessor 702 can send commands to, provide prompts to, receive inputs from, and provide user interfaces to the displays of, the other types of devices, in addition to any other type of control afforded by the capabilities of the applications microprocessor 702. As illustrated, the applications microprocessor 702 could also have a more direct connection to provide display information to the touch screen display 704 that bypasses accessory hub 709.

Figure 8:
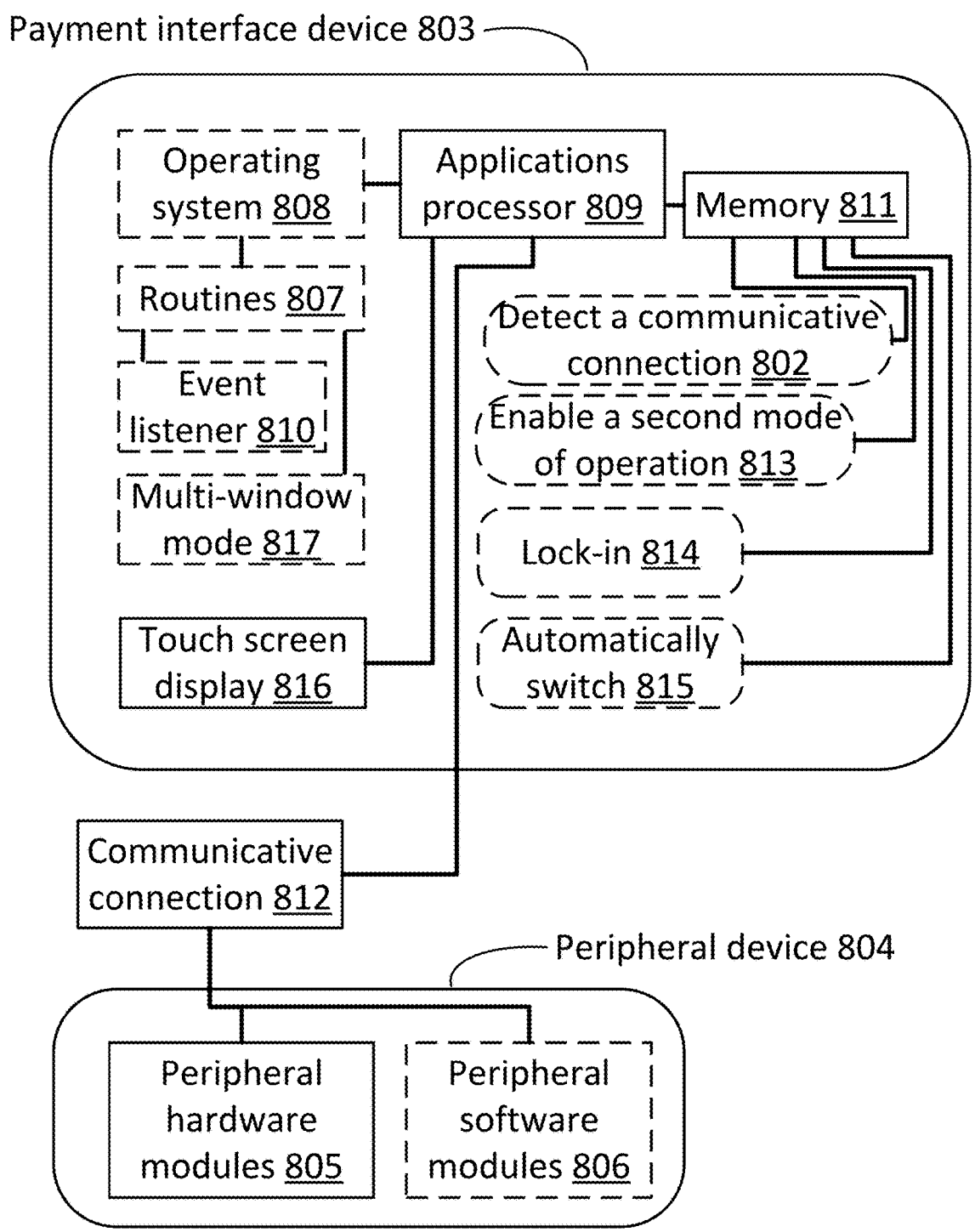
FIG. 8 illustrates a block diagram for a dual mode payment device operating in two modes of operation in which one mode of operation uses a short-range wireless protocol in accordance with specific embodiments of the invention disclosed herein.

FIG. 8 illustrates a block diagram for configurations of hardware modules and software modules that can be used to describe the means for detecting and the means for enabling mentioned above. The means for detecting can serve to detect a communicative connection 812 between a payment interface device 803 and a peripheral device 804, and other devices. The means for enabling can serve to enable the second mode of operation of the payment interface device 803, and other device modes. In this figure, solid lines that connect two blocks indicate a direct and two-way communicative connection between those blocks, rectangular blocks with solid borders indicate hardware modules whereas rectangular blocks with broken borders indicate software modules, and rectangular blocks with broken outlines and rounded corners indicate a process step used for the means for detecting or the means for enabling that can receive, generate, or transmit information that can travel along the block connections and through any number of blocks.

In some embodiments, the means for detecting can be located on and implemented by the payment interface device 803, while using and being contingent upon peripheral hardware modules 805 and peripheral software modules 806 on the peripheral device 804. The modules 805 and 806 can contain secure or unique identifiers that can be recognized by the payment interface device 803. The means for detecting can include modules instantiated by the applications microprocessor 809 that determine when a secure connection has been formed. For example, the means for detecting can include a state machine of a short-range wireless protocol module where states in which a pairing procedure have been concluded are detected. In a first example, the means for detecting can include specific kinds of peripheral hardware modules 805, or subcomponents thereof, containing device type identifiers, such as an accessory port type, an accessory hub type, a memory device type, a display device type, a speaker type, an image sensor type, a light sensor type, a thermal sensor type, a microphone type, a wireless modem type or type of any subsystem thereof, a data input device type, or another device type. The device type can be represented by any combination of type identifiers, such as the device company brand, manufacturing ID, industry standard, model number, or other hardware identifiers common to microelectronic devices. In a second example, the means for detecting 800 can include specific kinds of peripheral software modules 806, such as algorithms, operating systems, routines, applications, programs, code sequences, or other computer language-based identifiers. Specific examples of peripheral software modules 806 can include a device driver for any of the devices listed above, a software module stored in a memory, a non-compileable data file, a cryptographic key, or an embedded security signature. The peripheral software modules 806 can also include a counterpart short-range wireless protocol module involved in forming a connection with a short-range wireless protocol module instantiated by applications processor 809 or otherwise instantiated on payment interface device 803.

In some embodiments, the means for detecting can include hardware modules and software modules on the payment interface device 803. The means for detecting can include hardware modules such as a port on applications processor 809 that is dedicated for connections to peripherals, or a peripheral hub, that is designed to detect a wireless connection and inform an operating system 808 of the connection. The means for detecting can include routines 807 built into an operating system 808 of the payment interface device 803, wherein the routines 807 can be coded using the source code recognized by the operating system 808, the operating system 808 is instantiated by an applications processor 809, and the operating system 808 stored in a memory 811. If the operating system 808 were an Android operating system, the routines 807 could be written in Java, C++, Python, or some other language recognized by the Android operating system standards. The routines 807 can include an event listener 810 designed to detect when the portion of the operating system 808 responsible for interfacing with the peripheral device 804 can detect a communicative connection 802. The event listener 810 can be targeted to monitor and identify peripheral hardware modules 805 and peripheral software modules 806, such as the wireless radios and short-range wireless protocol modules mentioned herein. In this example, and using an Android operating system in place of operating system 808, the event listener 810 can register to receive broadcasts from the BluetoothProfile.ServiceListener. The means for detecting can include registering an event listener 810 with the operating system 808, transmitting a connection event by the BluetoothProfile.ServiceListener, and receiving that broadcast at the payment interface device 803 with the registered event listener 810.

In some embodiments, the means for detecting, using any of the embodiments described above with reference to FIG. 8, can enable a change of mode of operation of the payment interface device 803. The payment interface device 803 can begin operation in a first mode of operation. Subsequently, the means for detecting can detect a communicative connection 802, and the means for enabling can enables a second mode of operation 813 in response to the means for detecting. The second mode of operation can include maintaining the device in an undiscoverable state. An applications processor 809 can be programmed to detect a communicative connection 802 and the programming can be stored in a memory 811. The means for enabling can likewise, as illustrated, include programming stored in memory 811. The means for enabling can include instructions to enable the second mode of operation 813. This programming may enable a user to confirm that the second mode of operation should be entered via the display of a prompt for that confirmation or via unlocking a menu option to receive that confirmation. The means for enabling can include instructions to lock-in 814 the second mode of operation wherein the programming to lock-in can be implemented by the applications processor 809 and stored in the memory 811. The means for enabling can additionally or alternatively include instructions to automatically switch 815 from the first mode of operation to the second mode of operation upon the detecting of a communicative connection 802 with the means for detecting 800. The programming to automatically switch 815 can be stored in a memory 811.

In some embodiments, the means for enabling can include hardware and software modules on the payment interface device 803 that serve to enable a second mode of operation 813 for the payment interface device 803 and the peripheral device 804. The means for enabling can be designed to trigger the creation of multiple system interfaces by the payment interface device 803, using multi-window or split-screen operating system 808 capabilities. In one example, when multiple system interfaces are created, one system interface can be shown on a touch screen display 816 on the payment interface device 803, and another system interface can be shown on a peripheral hardware modules 805 touch screen display on the peripheral device 804. The means for enabling can include routines 807 built into the operating system 808 of the payment interface device 803. The routines 807 can be coded using the source code recognized by the operating system 808. For example, if the operating system 808 were an Android operating system the routines can be written in Java, C++, Python, or some other language.

In specific embodiments, the routines 807 can use a multi-window mode 817, native to operating system 808 versions of Android 7.0 Nougat and later, to utilize Multi-WindowMode commands to control the dimensions, pixel resolution, orientation, and other characteristics of the system interfaces to display properly on the displays. The multi-window mode 817 can enable the applications processor 809, in response to detecting a communicative connection 812 and enabling a second mode of operation 813, to generate a customer system interface on the touch screen display 816 on the payment interface device 803, and to generate a merchant system interface on a peripheral hardware modules 805 touch screen display on the peripheral device 804 by sending the merchant system interface display information to the peripheral device 804 through the communicative connection 812. In these embodiments, the applications processor and peripheral software modules can also include payment flow display services and short-range wireless protocol modules for packaging the information from the MultiWindowMode commands into a format amendable to transmission over the communicative connection 812 and reassembly into display data on the peripheral device 804. The applications processor 809 can receive inputs through the merchant system interface displayed on the peripheral hardware modules 805 touch screen display, indicated by touch information provided on the touch screen display by the user, and sent to the applications processor 809 through the communicative connection 812. If the system is programmed to automatically switch 815, the displays can be generated automatically and as soon as the detection of a communicative connection 812 occurs. If the system is programmed to lock-in the second mode of operation 814, the displays can be generated as described in the first example and the mode of operation cannot change in response to inputs provided by a user using the payment interface device 803, such as a customer interacting with the payment interface device 803 through a customer system interface. Alternatively, if the system is programmed to lock-in 814, the displays can be generated as described in the first example and the mode of operation can change in response to inputs provided by a user using the payment interface device 803 only if the user enters a secure command to unlock, such as a merchant interacting with the payment interface device 803 through a customer system interface.

In specific embodiments of the invention, the devices disclosed herein, and the short-range wireless protocol modules disclosed herein, can be programmed to enhance the security and convenience of the POS systems to which they are a part by modifying the procedures by which the devices are able to identify available devices for pairing. In certain short-range wireless protocols, the option to form a secure connection between devices is made available through an initial discovery process in which devices discover other devices that are available for forming a secure connection. The process can involve individual devices entering a discovery mode in which they search for alternative device to pair with, a discoverable mode in which they make themselves available for discovery to other devices, and an undiscoverable mode in which they make themselves unavailable for discovery to other devices. A device that is in discovery mode can also be in discoverable mode or undiscoverable mode. Different applications of these modes to different devices can enhance the convenience and security of the POS system specific examples of which are provided below.

In specific embodiments of the invention, devices in a specific class of devices include short-range wireless protocol modules which include instructions to maintain the device in a discoverable state as soon as they are removed from their packaging and turned on. In other words, as soon as the devices are powered and switched on, they enter a discoverable mode to make themselves available for pairing. The device will accordingly be visible to any device, including unscrupulous monitoring devices, but by utilizing the approaches for forming a secure connection mentioned above, and particular those which utilize a ACCE protocol, unscrupulous monitoring devices will not be able to mount an MIM attach against the system. This approach can beneficially be applied to peripheral, add-on, or accessory devices where multiple devices are meant to pair with a central terminal as a device that can discover the new device will likely already be installed when such an add-on device is brought out of the box.

In specific embodiments of the invention, devices in a specific class of devices include short-range wireless protocol modules which include instructions to maintain the device in a discoverable state when unpaired and devices in a second class of devices include short-range wireless protocol modules which include instructions to maintain the device in a discovering state when unpaired. For example, the payment interface devices disclosed herein could maintain themselves in a discoverable state when unpaired and the display devices could maintain themselves in a discovering state when unpaired. As another example, customer facing payment interface devices could maintain themselves in a discoverable state when unpaired and merchant facing payment interface devices could maintain themselves in a discovering state when unpaired. As another example, peripheral devices could maintain themselves in a discoverable state when unpaired and dual mode devices could maintain themselves in a discovering state when unpaired. In these same embodiments, one or more of the classes of devices could maintain themselves in an undiscoverable state when paired. For example, the payment interface devices disclosed herein could maintain themselves in an undiscoverable state when they are successfully paired. This approach would increase the security of the system as being exposed for discovery adds another potential surface of attack for unscrupulous parties, and in specific embodiments of the invention disclosed herein a paired device can be considered to be within a compliant zone of security of the POS system once it has formed a secure connection.

Figure 9:
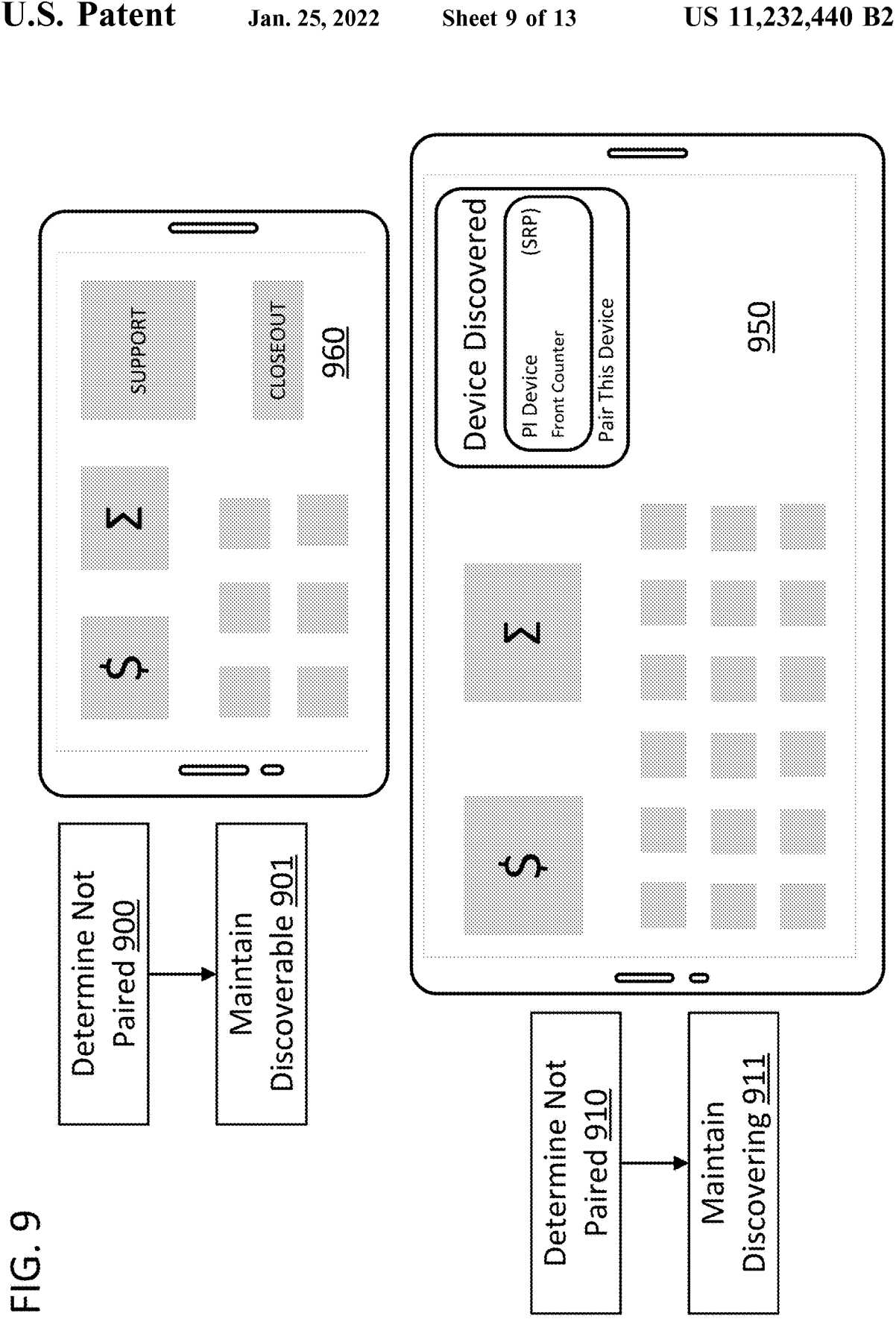
FIG. 9 illustrates a set of interfaces and an accompanying set of flow charts for a set of methods for allowing two devices to pair using a short-range wireless protocol in accordance with specific embodiments of the invention disclosed herein.

FIG. 9 illustrates two discrete devices presenting user interfaces during a pairing procedure to form a secure connection in accordance with embodiments of the present invention disclosed herein. The interface of the merchant device 950 is presenting a dialog that a device has been discovered with an identifier for the device. In this case the device has been previously named "Front Counter" and the user of device 950 is given the option to begin a pairing procedure in which a secure connection in accordance with the disclosure above will be formed between device 960 and device 950. The accompanying flow charts show the execution of a step 900 in which device 960 determines that it is not paired and therefore executes a step 901 of maintaining device 960 in a discoverable state. The accompanying flow charts also show the execution of a step 910 in which device 960 determines that it is not paired and therefore executes a step 911 of maintaining device 950 in a discovering state. Since device 960 is maintained in a discoverable state and device 950 is maintained in a discovering state, device 950 detects device 960 and device 950 presents its identifier for presentation to a user of device 950 as illustrated.

Figure 10:
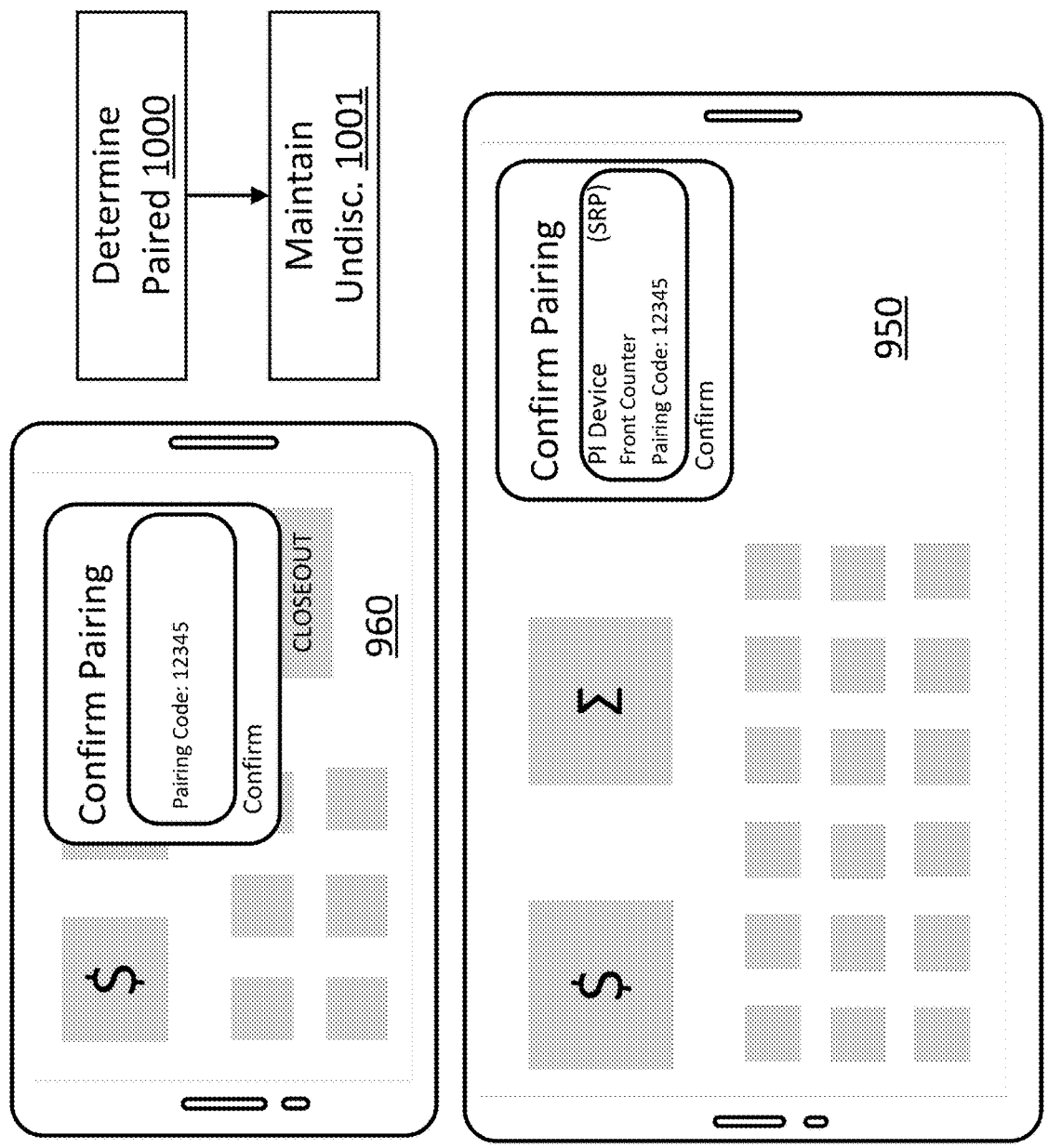
FIG. 10 illustrates a set of interfaces and an accompanying flow chart for a set of methods for allowing two devices to authorize a pairing operation in accordance with specific embodiments of the invention disclosed herein.

FIG. 10 illustrates two discrete devices presenting user interfaces during a pairing procedure to form a secure connection in accordance with embodiments of the present invention disclosed herein. The interface of the merchant device 950 is presenting a dialog that a device has been discovered and is presenting a pairing code for inspection by the user of device 950. The interface of device 960 is likewise displaying the same pairing code for inspection by the same user. This step of numeric comparison is used to protect the secure connection from MIM attacks by assuring that authorization provided on device 950 is authorization to pair with the desired device. The accompanying flow chart show the execution of a step 100 in which device 960 determines that it is paired and therefore executes a step 1001 of maintaining device 960 in an undiscoverable state. This approach introduces certain security benefits as described above.

Figure 11:
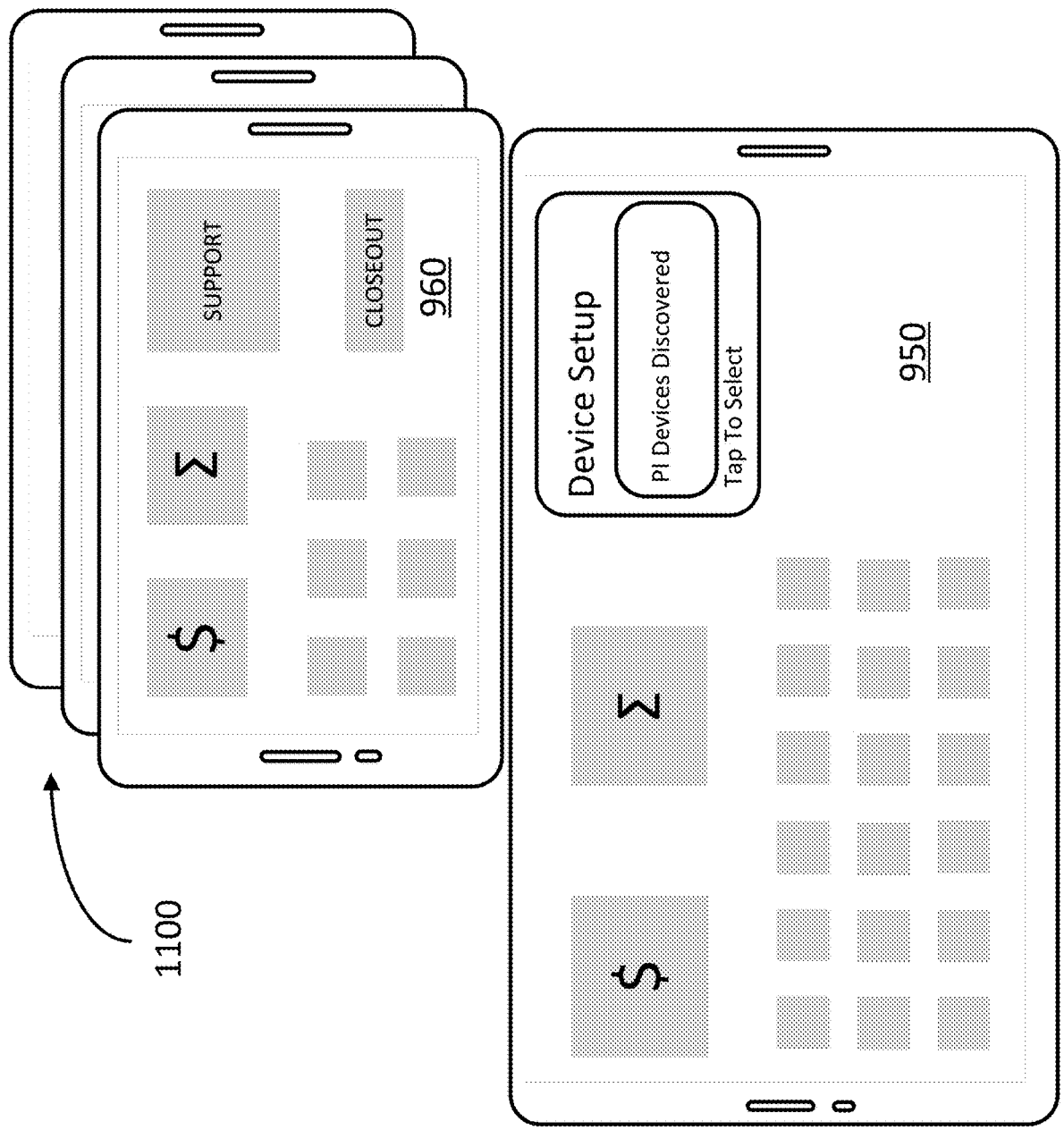
FIG. 11 illustrates an interface for a device which informs a user that multiple automatically discoverable payment interface devices are available for pairing in accordance with specific embodiments of the invention disclosed herein.
Figure 12:
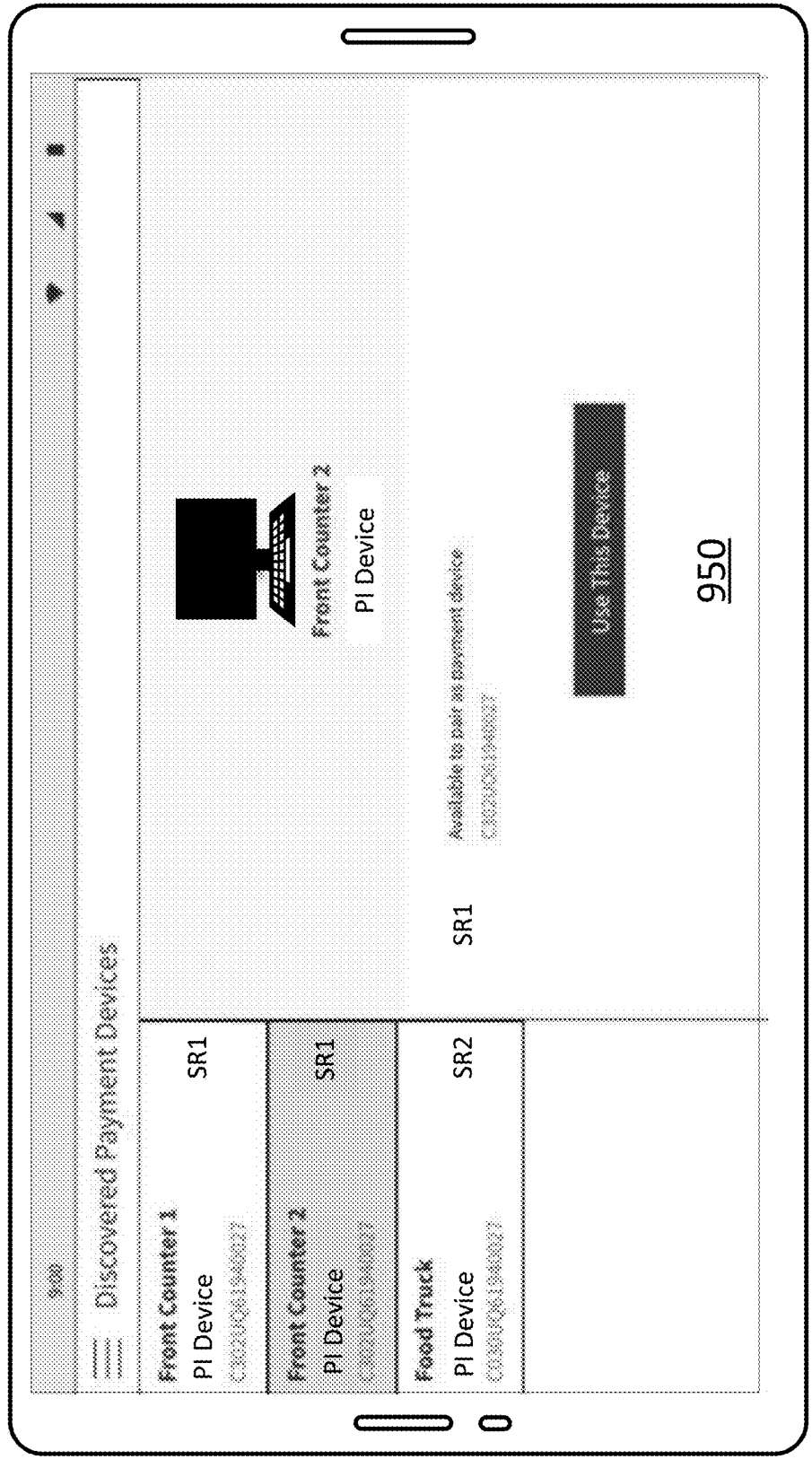
FIG. 12 illustrates an interface for a device which allows a user to select from multiple automatically discoverable payment interface devices for pairing in accordance with specific embodiments of the invention disclosed herein.

FIGS. 11 and 12 illustrate how a merchant device 950 can be configured to select from among multiple counterpart device 1100 during a pairing procedure. As shown in FIG. 11 the multiple counterpart devices can all be maintaining themselves in a discoverable state, and device 950 can present a prompt to view the multiple potential devices to pair with. The button "Tap to Select" is displayed to allow a user of device 950 to tap and select a device to pair device 950 with. Upon selecting the button, the interface in FIG. 12 is displayed on device 950. The interface allows a user to select from multiple devices on the left side panel, review detailed information regarding the device in the center of the screen, and then select the device for pairing using the large button in the center of the interface.

FIG. 13 presents a flow chart 1300 for a set of methods that can be used with various embodiments of the invention disclosed herein. The method includes a step 1301 of providing a first device with a display. The device can be a payment interface device. The device can have a first touch screen display and at least one means for receiving payment information. The method also includes a step 1302 of instantiating a first payment flow display service using an operating system of the first device. The method also includes a step 1303 of providing a second device with a display. The device can have a second touch screen display. The method also includes a step 1304 of instantiating a second payment flow display service using an operating system of the second device. The method also includes a step 1305 of forming a secure wireless connection using a first short-range wireless transceiver on the first device and a second short-range wireless transceiver on the second device. In specific embodiments of the invention, step 1305 can be conducted using an elliptical curve key exchange. In specific embodiments of the invention, step 1305 can be conducted using an authenticated and confidential channel establishment (ACCE) protocol. In specific embodiments, step 1304 can be preceded by a step 1306 of installing the payment flow display service on the second device from an SDK.

After the secure connection is formed, it can be used to execute a payment flow. Flow chart 1300 includes a step 1307 of executing a payment flow. The step of executing a payment flow 1307 can include several steps as shown. Flow chart 1300 includes a step 1308 of exchanging messages over the secure wireless connection to execute a payment flow using the first payment flow display service and the second payment flow display service. The payment flow can include displaying information on the first device's display, using both the first and second payment flow display services and based on information received on the second device. For example, the payment flow can include a step 1309 of displaying screens on the displays of both the first and second devices. The screens can be presented based on messages received from the exchange of messages in step 1308. The payment flow can also include, as illustrated, a step 1310 of encrypting payment information received by the means for receiving payment information. In specific embodiments of the invention, step 1310 can be conducted using a symmetric block cipher. In specific embodiments of the invention, the step of presenting screens 1309 can be preceded by a step 1311 of storing data for the screens on the devices on which the screens will be presented. The screens can then be modified based on data received over the secure connection and be presented based on that data.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. The secure connection can require authentication by a supervisor input such as a manager PIN entry or biometric entry on both devices. The devices can refuse to connect unless they determine that a high enough quality connection exists between the two devices. The devices disclosed herein that are linked via a secure wireless connection can be terminals, smartphone, point of sale terminals, tablets, or any other devices that has a display and/or a means for receiving payment information. The merchant display device can be a terminal, a smartphone, a point of sale terminal, a tablet, or any other device that has a displace and can be communicatively connected to the dual mode payment interface device. Although examples in the disclosure are generally directed to a short-range wireless protocol, the same approaches could be utilized to any wireless protocol. Furthermore, though many of the examples involved two devices with touch screens, the devices can alternatively have regular displays without touch technology, and neither device necessarily includes a display. The devices can exchange solely payment information over the secure connection and do not necessarily need to exchange display dispositive information. These and other modifications and variations to the present invention may be practiced by those skilled in the art, without departing from the scope of the present invention, which is more particularly set forth in the appended claims.

What is claimed is:

1. A system, comprising:
   a dual mode payment interface device having a first touch screen display and configured to operate in a first mode of operation and a second mode of operation;
   wherein the first mode of operation: provides access to a merchant system interface on the first touch screen display; and provides access to a customer system interface on the first touch screen display;
   wherein the second mode of operation: provides a customer system interface on the first touch screen display; and does not provide access to the merchant system interface on the first touch screen display;
   a merchant display device having a second touch screen display;
   wherein the merchant display device provides access to the merchant system interface on the second touch screen display;
   a first short-range radio on the dual mode payment interface device and a second short-range radio on the merchant display device that provide a secure wireless connection between the dual mode payment interface device with the merchant display device;
   a payment flow display service instantiated on the dual mode payment interface device;
   a means for detecting the secure wireless connection, located on the dual mode payment interface device;
   a means for enabling, in response to the means for detecting the secure wireless connection detecting the secure wireless connection: (i) the second mode of operation; and (ii) the payment flow display service; and
   wherein the payment flow display service controls the second touch screen display over the secure wireless connection during the second mode of operation.

2. The system of claim 1, wherein:
   the dual mode payment interface device is programmed to detect the secure wireless connection using an event listener registered with an operating system of the dual mode payment interface device.

3. The system of claim 1, wherein:
   the dual mode payment interface device is programmed to lock-in the second mode of operation upon detecting the secure wireless connection, and wherein the second mode of operation is locked-in until the secure wireless communication is lost.

4. The system of claim 1, wherein:
   the dual mode payment interface device is configured to switch from the first mode of operation to the second mode of operation automatically upon detecting the secure wireless connection with the means for detecting the secure wireless connection.

5. The system of claim 1, wherein at least one of the dual mode payment interface device or the merchant display device remains in a discovering mode during the first mode of operation to enable pairing with the other of the merchant display device or the dual mode payment interface device.

6. The system of claim 1, wherein in the second mode of operation, the dual mode payment interface device transmits information over the secure wireless connection necessary to display the merchant system interface on the second touch screen display.

7. The system of claim 1, wherein the dual mode payment interface device presents, on the first touch screen display, a request for a merchant unlock code when switching back from the second mode of operation to the first mode of operation, and wherein upon receiving the merchant unlock code, the dual mode payment interface device reverts back to the first mode of operation.

8. The system of claim 1, wherein the customer system interface provides a prompt for payment information, and wherein the merchant system interface provides a prompt for payment total confirmation.

9. The system of claim 1, wherein the dual mode payment interface device further comprises an applications processor configured to control the customer system interface and the merchant system interface.

10. The system of claim 1, wherein the dual mode payment interface device further comprises a secure processor to process payment information received via the dual mode payment interface device in a cryptographically secure manner.

11. The system of claim 10, wherein the secure processor is connected to the applications processor, and wherein the payment information is not communicated to the applications processor.

12. The system of claim 1, wherein the payment flow display service is configured to translate views intended for display on the merchant display device into messages for transmission to the merchant display device via the secure wireless connection.

13. The system of claim 12, wherein the payment flow display service is a first payment flow display service, and wherein a second payment flow display service on the merchant display device is configured to translate the messages back into the views for display on the merchant display device.

14. At least one non-transitory computer-readable media comprising computer-readable instructions stored thereon that when executed by a first processor of a dual mode payment interface device and a second processor of a merchant display device cause the first processor and the second processor to:
   operate, by the first processor, the dual mode payment interface device in a first mode of operation and a second mode of operation, wherein in the first mode of operation, the dual mode payment interface device provides access to a merchant system interface on a first touch screen display of the dual mode payment interface device and provides access to a customer system interface on the first touch screen display, and wherein in the second mode of operation, the dual mode payment interface device provides access to the customer system interface on the first touch screen display and does not provide access to the merchant system interface on the first touch screen display; and provide, by the second processor, access to the merchant system interface on a second touch screen display of the merchant display device, wherein a first short-range radio on the dual mode payment interface device and a second short-range radio on the merchant display device provide a secure wireless connection between the dual mode payment interface device and the merchant display device;

wherein in response to detecting the secure wireless connection, (i) the second mode of operation; and (ii) a payment flow display service instantiated on the dual mode payment interface device are enabled; and wherein the payment flow display service controls the second touch screen display over the secure wireless connection during the second mode of operation.

15. The at least one non-transitory computer-readable media of claim 14, wherein the first processor further executes computer-readable instructions to detect the secure wireless connection using an event listener registered with an operating system of the dual mode payment interface device.

16. The at least one non-transitory computer-readable media of claim 14, wherein the first processor further executes computer-readable instructions to lock-in the second mode of operation upon detecting the secure wireless connection, and wherein the second mode of operation is locked-in until the secure wireless communication is lost.

17. The at least one non-transitory computer-readable media of claim 14, wherein the first processor further executes computer-readable instructions to switch from the first mode of operation to the second mode of operation automatically upon detecting the secure wireless connection.

18. The at least one non-transitory computer-readable media of claim 14, wherein in the second mode of operation, the first processor transmits information over the secure wireless connection necessary to display the merchant system interface on the second touch screen display.

19. The at least one non-transitory computer-readable media of claim 14, wherein the first processor presents, on the first touch screen display, a request for a merchant unlock code when switching back from the second mode of operation to the first mode of operation, and wherein upon receiving the merchant unlock code, the first processor reverts the dual mode payment interface device back to the first mode of operation.

20. The at least one non-transitory computer-readable media of claim 14, wherein the customer system interface provides a prompt for payment information, and wherein the merchant system interface provides a prompt for payment total confirmation.

* * * * *